US009654581B2

(12) United States Patent
Pollack et al.

(10) Patent No.: US 9,654,581 B2
(45) Date of Patent: May 16, 2017

(54) PROXIED PUSH

(71) Applicant: APPLE INC., Cupertino, CA (US)

(72) Inventors: Daniel B. Pollack, San Francisco, CA (US); Gokul P. Thirumalai, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 14/475,060

(22) Filed: Sep. 2, 2014

(65) Prior Publication Data
US 2015/0350362 A1 Dec. 3, 2015

Related U.S. Application Data

(60) Provisional application No. 62/005,325, filed on May 30, 2014.

(51) Int. Cl.
*H04L 29/08* (2006.01)

(52) U.S. Cl.
CPC .......... *H04L 67/2833* (2013.01); *H04L 67/26* (2013.01); *H04L 67/2861* (2013.01); *H04L 67/24* (2013.01); *H04L 67/289* (2013.01)

(58) Field of Classification Search
CPC ............................ H04L 67/2833; H04L 67/26
USPC ........................................................ 709/217
See application file for complete search history.

(56) References Cited

U.S. PATENT DOCUMENTS

| 7,130,664 | B1 | 10/2006 | Williams |
| 8,068,860 | B1 | 11/2011 | Midkiff |
| 8,787,006 | B2 | 7/2014 | Golko et al. |
| 8,964,947 | B1* | 2/2015 | Noolu ................... H04M 3/541 379/88.01 |
| 2002/0115478 | A1 | 8/2002 | Fujisawa et al. |

(Continued)

FOREIGN PATENT DOCUMENTS

| JP | 2009164780 A2 | 7/2009 |
| JP | 2009164783 A2 | 7/2009 |

(Continued)

OTHER PUBLICATIONS

International Search Report and Written Opinion mailed Sep. 2, 2015 in PCT/US2015/032477, 10 pages.

*Primary Examiner* — Brian J Gillis
*Assistant Examiner* — Steve Lin
(74) *Attorney, Agent, or Firm* — Kilpatrick Townsend & Stockton LLP

(57) ABSTRACT

A system and method are described for establishing two-way push communication between an intermediate or companion device and a mobile device. Mobile devices register to listen for push notifications delivered through a push notification service from a specified set of providers. The presence of the mobile devices is delivered to the push notification service that maps the mobile devices to connections made between their respective companion devices and the push notification service. If the push notification service determines that a mobile device is "online," in response to receiving a push notification for the mobile device, a current network connection over which a companion device is listening for push notifications is identified and the push notification is forwarded to the companion device. The companion device then can deliver the push notification to the mobile device.

24 Claims, 12 Drawing Sheets

(56) References Cited

U.S. PATENT DOCUMENTS

| | | | |
|---|---|---|---|
| 2007/0239884 A1* | 10/2007 | Karmakar | H04L 67/26 709/232 |
| 2009/0158397 A1* | 6/2009 | Herzog | H04L 12/5895 726/4 |
| 2009/0252072 A1* | 10/2009 | Lind | H04W 76/045 370/311 |
| 2010/0216434 A1 | 8/2010 | Marcellino et al. | |
| 2010/0227605 A1* | 9/2010 | Fournier | H04L 63/123 455/419 |
| 2010/0227632 A1 | 9/2010 | Bell | |
| 2012/0063385 A1 | 3/2012 | Yang et al. | |
| 2012/0077467 A1 | 3/2012 | Fan et al. | |
| 2012/0297463 A1 | 11/2012 | Orbach et al. | |
| 2012/0307655 A1 | 12/2012 | Vyrros | |
| 2013/0301516 A1 | 11/2013 | Ur et al. | |
| 2013/0311594 A1* | 11/2013 | Luna | H04W 8/00 709/213 |
| 2014/0016554 A1* | 1/2014 | Lee | H04W 76/045 370/328 |
| 2014/0045547 A1 | 2/2014 | Singamsetty et al. | |
| 2014/0115125 A1* | 4/2014 | Chen | H04L 67/26 709/219 |
| 2015/0026356 A1 | 1/2015 | Kaplinger et al. | |
| 2015/0099505 A1 | 4/2015 | Kiukkonen | |
| 2015/0350856 A1 | 12/2015 | Circosta et al. | |

FOREIGN PATENT DOCUMENTS

| | | |
|---|---|---|
| JP | 2010268330 A2 | 11/2010 |
| WO | 2015/183829 A1 | 12/2015 |

* cited by examiner

PROXIED PUSH

CROSS-REFERENCES TO RELATED APPLICATIONS

This application claims the benefit of and priority to U.S. Provisional Application No. 62/005,325, filed May 30, 2014 and entitled "PROXIED PUSH," the entire disclosure of which is hereby incorporated by reference for all purposes.

This Application is related to the following U.S. Patent Applications: U.S. Provisional Application No. 62/005,550 filed May 30, 2014 and entitled "ANSWER AND HOLD WITH CLIENT AND HOST" by Rauenbuehler et al.; U.S. Provisional Application No. 62/005,534 filed May 30, 2014 and entitled "ANSWERING A CALL WITH CLIENT THROUGH A HOST" by Rauenbuehler et al.; U.S. Provisional Application No. 62/005,606 filed May 30, 2014 and entitled "CLIENT APPLICATIONS COMMUNICATING VIA A USER TUNNEL" by Tung et al.; U.S. Provisional Application No. 62/005,336, filed May 30, 2014 and entitled "SMS PROXYING" by Circosta et al.; U.S. Provisional Application No. 62/005,505 filed May 30, 2014 and entitled "MANAGING CONNECTIONS OF A USER DEVICE" by Schobel et al.; U.S. Provisional Application No. 62/005,565 filed May 30, 2014 and entitled "APPLICATION-LEVEL ACKNOWLEDGEMENTS" by Pollack et al.; U.S. Provisional Application No. 62/005,586 filed May 30, 2014 and entitled "MESSAGES WITH ATTENUATING RETRANSMIT IMPORTANCE" by Pollack et al.; U.S. Provisional Application No. filed May 30, 2014 and entitled "UNIFIED MESSAGE DELIVERY BETWEEN PORTABLE ELECTRONIC DEVICES" by Pollack et al.; U.S. Provisional Application No. 62/005,990 filed May 30, 2014 and entitled "USER INTERFACE FOR PHONE CALL ROUTING AMONG DEVICES" by Coffman et al.; and U.S. Provisional Application No. 62/505,799 filed May 30, 2014 and entitled "PROTOCOL SWITCHING IN INTER-DEVICE COMMUNICATION" by Prats et al., which are commonly owned and are hereby incorporated by reference for all purposes. The present application is also related to U.S. Provisional Application 61/953,591, entitled "DYNAMIC LINK ADAPTATION FOR IMPROVED LINK MARGIN," by Liu et al., filed Mar. 14, 2014, which is hereby incorporated by reference for all purposes.

BACKGROUND

The present disclosure relates generally to communications between electronic devices and in particular to two-way delivery of content using proxy and proxied devices.

Mobile electronic devices, such as laptops, palmtops, mobile phones, smart phones, multimedia phones, portable media players, GPS units, mobile gaming systems, etc., have become quite popular. Many users carry a device almost everywhere they go and use their device for a variety of purposes, including making and receiving phone calls, sending and receiving text messages and emails, navigation (e.g., using maps and/or a GPS receiver), purchasing items in stores (e.g., using contactless payment systems), and/or accessing the Internet (e.g., to look up information). A user's mobile device can be carried or worn and perform a variety of smart functions in addition to traditional functions formerly implemented by a single application-specific device.

Mobile devices can have applications that access a variety of content, such as email and websites, streaming audio/video, social media, and the like. Some applications can periodically receive notifications from services that new content is available. Such applications can include "push" e-mail services (e.g., MobileMe, Microsoft Exchange, ActiveSync, Push-IMAP, Yahoo! Push, etc.), or other push services (e.g., update/upgrade services, news services, web blog services, podcast services, social networking services, or other types of services where notification messages may be sent). Notification messages typically represent events of interest, which are typically defined by the applications (e.g., new e-mail indicator, new news item indicator, new podcast indicator, change of on-line status of a social networking friend, etc.).

The increase in the use of mobile devices magnifies the complexity of routing notification messages to these devices. One problem is that many users more frequently carry around multiple mobile devices almost everywhere they go increasing the complexity of routing content to the right devices. Another problem is that users use their devices for a variety of overlapping and non-overlapping purposes making it more difficult to determine which of a users' two mobile devices having the same application installed is the intended destination of content. Furthermore, given that some mobile devices are not inherently addressable, it is difficult to route messages to these mobile devices, particularly on a large scale when multiple devices per user are in use, when it is not known how to contact the devices.

Accordingly, what is desired is to solve problems relating to coordinating and handling the delivery of content to and from user devices, some of which may be discussed herein. Additionally, what is desired is to reduce drawbacks relating to power management and efficiency when delivering content to and from user devices while also extending the functionality and accessibility of these devices, some of which may be discussed herein.

BRIEF SUMMARY

A system and method are described for establishing two-way communication between a content delivery service and mobile devices. As it can be power inefficient for mobile devices (acting as proxied devices) to maintain a persistent connection with the service in order to receive push content from a specified set of providers, the "online" presence of each of the mobile devices can be asserted to the service using companion devices (acting as proxy devices). In various embodiments, mobile devices initially register to have push content delivered through the service. The service can map registered mobile devices to connections made between their respective companion devices and the service upon receiving assertions of presence from the mobile devices (e.g., provided through the companion devices). In response to receiving push content for a registered mobile device, the service determines whether the mobile device is "online" using its mappings. If so, a current network connection is identified over which its corresponding companion device is listening for its own push content. The service can forwarded the push content to the companion device over the companion device's connection instructing the companion device to deliver the push content to the mobile device.

Certain embodiments of the invention relate to communicating between a wearable device (as a proxied device) and a host device (as a proxy device). For example, a wearable device can establish a wireless communications link with the host device (e.g., via a pairing process or the like). The wearable device can determine the most power efficient manner of communicating with the host device. The wearable device can chose one type of wireless communication over another if one consumes more power at the mobile device than the other. Accordingly, an intermittent and non-persistent link can be chosen in order to maximize power consumption, reduce interface, or satisfy other predetermined criteria while also allowing two-way communication.

In some embodiments, to receive push content from a content delivery service, the wearable device can assert its "online" presence to the service over a predetermined wireless communication link with the host device. The host device participates in interactions between the wearable device and the service to ensure successful delivery of the push content to and from the mobile device. The wearable device can receive push content from the service as the host device acts on its behalf sending and receiving messages with the service using its own persistent connection to the service. The wearable device can forward push content to the service as the host device acts on its behalf sending and receiving messages with the service using its own persistent connection to the service.

In some embodiments, a companion device to a mobile device can detect that an established wireless communication link with the companion device is unsuitable for communication. The companion device can determine that the link is of too poor a quality for communication or that link has been severed or otherwise terminated, either intentionally by the mobile device or due to the lack of interacting with the mobile device across the link for a predetermined period of time. When certain conditions are met, the companion device can assert an "offline" presence to a content delivery service over its own link to the service that instructs the service to mark the mobile device as being "offline." In various embodiments, the service can disassociate the mobile device from the persistent connection of the companion device queuing push content for later delivery.

In some embodiments, a mobile device can connect directly to a content delivery service and retrieve any queued push content. In one embodiment, an assertion of "online" presence by the mobile device directly to the service can cause the service to update its mappings of its own accord. The service can disassociate the mobile device from its mappings to the connections of any companion devices.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

I. Introduction

Systems and methods are described for establishing two-way communication between a content delivery service and mobile devices. As it can be power inefficient for mobile devices (acting as proxied devices) to maintain a persistent connection with the service in order to receive push content from a specified set of providers, the "online" presence of each of the mobile devices can be asserted to the service using companion devices (acting as proxy devices). In various embodiments, mobile devices initially register to have push content delivered through the service. The service can map registered mobile devices to connections made between their respective companion devices and the service upon receiving assertions of presence from the mobile devices (e.g., provided through the companion devices). In response to receiving push content for a registered mobile device, the service determines whether the mobile device is "online" using its mappings. If so, a current network connection is identified over which its corresponding companion device is listening for its own push content. The service can forwarded the push content to the companion device over the companion device's connection instructing the companion device to deliver the push content to the mobile device.

A. System

Figure 1:
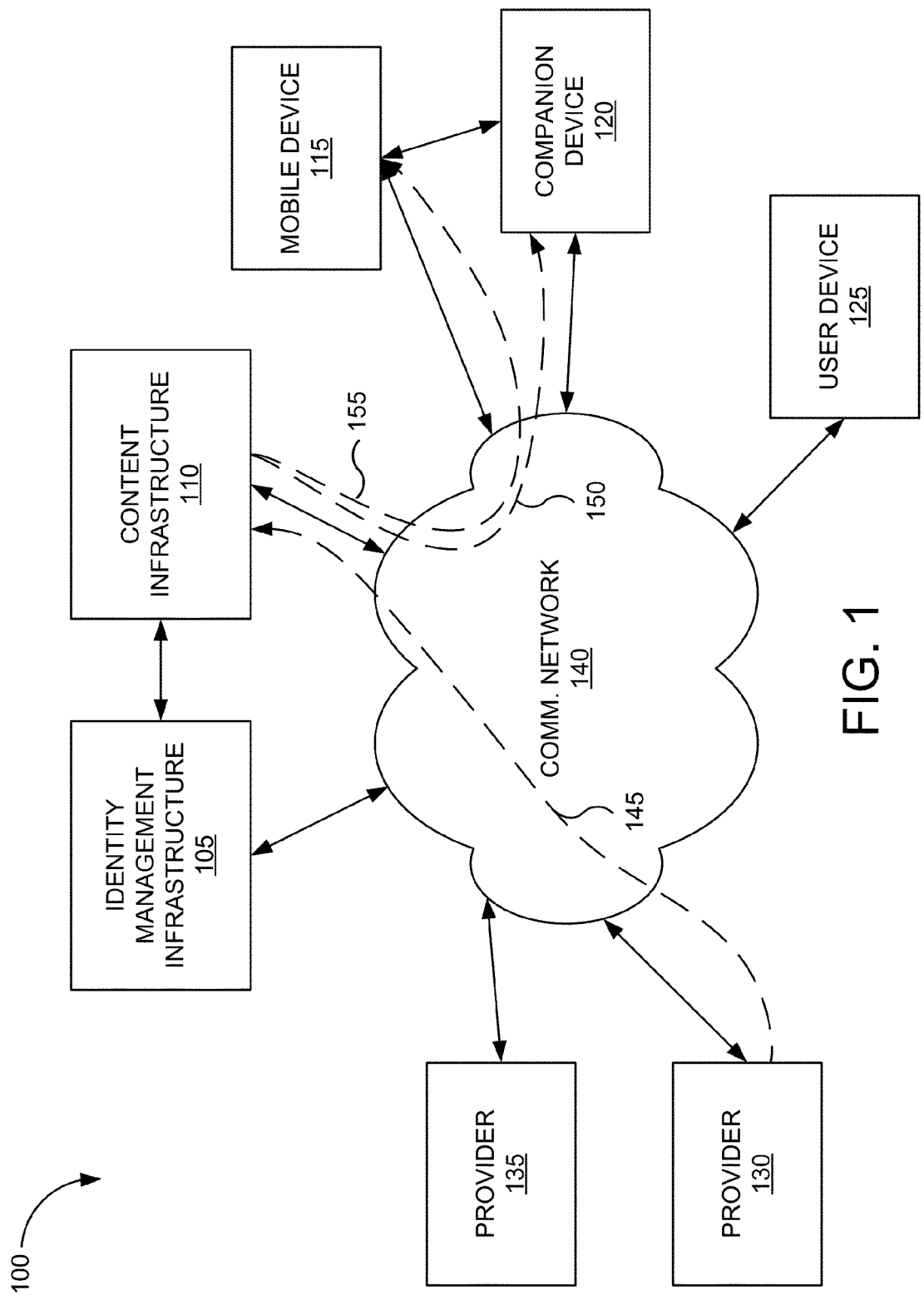
FIG. 1 is a block diagram of a device management and content delivery ecosystem according to various embodiments.

FIG. 1 is a block diagram of a device management and content delivery ecosystem 100 according to various embodiments. FIG. 1 and other figures are merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures. The devices in system 100 can include hardware and/or software elements.

In one embodiment, ecosystem 100 includes an identity management infrastructure 105, content infrastructure 110 (i.e., one or more servers that implement a voice/video call service, a messaging service, and/or a push notification service), mobile device 115, companion device 120, user device 125, provider 130, provider 135, and communications network 140. As illustrated, identity management infrastructure 105, content infrastructure 110, mobile device 115, companion device 120, user device 125, provider 130, and provider 135 are each capable of communicating with and through communications network 140 (representing the Internet, wide area networks (WANs), metropolitan area networks (MANs), local area networks (LANs), wireless area networks (WiLANs), radio access network (RANs), public switched telephone network (PTSN), etc., and/or combinations of the same). Mobile device 115 can communicate directly with companion device 120 without utilizing communications network 140.

Identity management infrastructure 105 may be implemented in various embodiments using a single server computer system or may include multiple server computer systems, web servers, application servers, networks, interconnects, and the like. In various aspects, identity management infrastructure 105 provides management of individual entities, their authentication, authorization, and privileges within or across systems, such as content infrastructure 110. Identity management services provided by identity management infrastructure 105 can include technologies and services such as Active Directory, identity providers, password managers, access control providers, single sign-on (SSO) services, OAuth, security token services, or the like.

In various embodiments, identity management infrastructure 105 maintains information that authenticates the identity of a managed entity (such as a user, organization, and any associated devices, resources, services, applications, or the like). Identity management infrastructure 105 can verify that an entity is who/what it claims to be using a password, biometrics such as a fingerprint, a distinctive behavior such as a gesture pattern on a touchscreen, challenge-response protocols, one-time passwords (OTPs), 2-way authentications, and other techniques. Identity management infrastructure 105 further can manage authorization information that defines what operations an entity can perform in the context of a specific application, service, or resource. Some authorizations may be based on a role, device type, application, application type, or the like associated with a managed entity. Users are granted roles often related to a particular job or job function. Identity management infrastructure 105 can also manage descriptive information about managed entities and how and by whom that information can be accessed and modified.

In some embodiments, identity management infrastructure 105 creates digital identities for managed entities encompassing, for example, entity identifying information (PII) and ancillary information. In one aspect, a managed entity can have multiple digital identities and each digital identity can encompass multiple attributes. For example, a user can have a user identifier (e.g., a phone number, e-mail, etc.) that is linked to multiple devices. In addition to creation, deletion, modification of digital identities, identity management infrastructure 105 can manage ancillary entity data for use by services, such content infrastructure service 110.

In further embodiments, identity management infrastructure 105 can store capabilities of each device associated with a user identifier. Examples of device capabilities include whether a device includes a specific type or version of hardware, whether a device includes a specific type or version of software (e.g., operating systems or applications), whether a device is capable of performing a specific function such as placing and receiving phone calls or sending and receiving short message service (SMS)/multimedia message service (MMS) messages, whether a device is capable of maintaining connections with other devices, or the like. The list of devices associated with a user can be sent to and stored at any other device of that user, such as mobile device 115 and companion device 120 when associated with the same user identifier. Identity management infrastructure 105 can determine and collect capabilities of a device when it is registered and associated with the user identifier. Identity management infrastructure 105 can update the capabilities of a device periodically, for example, when the device re-registers or communicates with one or more services managed by identity management infrastructure 105.

In various embodiments, identity management infrastructure 105 can receive a single user identifier, which is used to determine device identifiers for devices associated with the user identifier. During entity registration, in order to access services or resources managed by identity management infrastructure 105, one or more user or other identifiers and a unique entity or device identifier (UID) may be combined to generate an entity or device token. In various embodiments, the token is encrypted by applying a hashing algorithm (e.g., SHA-0, SHA-1, SHA-2, MD5, Whirlpool, or other hashing algorithms). The token generated and encrypted for an entity can remain constant in various embodiments. Once a token has been generated and encrypted by identity management infrastructure 105, the token can be sent back to the entity. The entity in some aspects can then distribute the token to services or resources managed by identity management infrastructure 105 or other third party services for a variety of purposes relating to authentication, authorization, accounting, or the like of the entity at those managed services or resources or the trusted delivery of content to the entity by the third parties.

Content infrastructure 110 may be protected by and/or accessible to entities managed by identity management infrastructure 105. Content infrastructure 110 may be implemented in various embodiments using a single server computer system or may include multiple server computer systems, web servers, application servers, networks, interconnects, and the like.

Content infrastructure 110 can provide content to mobile device 115, companion device 120, and user device 125 as well as to other devices and entities. Examples of content include a text message, a multimedia message, an impending calendar event, an audio/video call (e.g., using VOIP), or a notification of new data on a remote server. In one embodiment, the content can originate from one or more sources managed by identity management infrastructure 105 or provided directly by content infrastructure 110. In other embodiments, the content can originate from other sources. For example, content may originate from any one of mobile device 115, companion device 120, user device 125, and providers 130 and 135.

In another example, content may be received from other sources such as the Internet, cellular networks, public switched telephone networks, and the like. Content infrastructure 110 can then route the content to mobile device 115, companion device 120, user device 125, and providers 130 and 135. In one embodiment, content infrastructure 110 may route through the infrastructure an SMS message received from or destined to a cellular network. In another embodiment, content infrastructure 110 may route through the infrastructure a voice call received from or destined to a public switched telephone network.

In some embodiments, the content sent to mobile device 115 can be forwarded to companion device 120 for delivery to mobile device 115. Companion device 120 can also act and send signals on behalf of mobile device 115. In these embodiments, companion device 120 acts as a main or intermediary device and mobile device 115 acts as a proxied device. Content infrastructure 110 can coordinate how and whether companion device 120 can act and send signals on behalf of mobile device 115.

In some embodiments, content infrastructure 110 can send content to more than one device, when appropriate. A user may be associated with both mobile device 115 and companion device 120. Content infrastructure 110 may route the content to both mobile device 115 and companion device 120, such as to have a VOIP phone call ring on both devices or to have a message appear in the inbox of the same application installed on both devices. In other embodiments, content is sent to only one device, e.g., to companion device 120, which may forward a call to mobile device 115. When a call is being forwarded to a device, a phone number can identify which device is to receive the phone/video call, and that device can relay a call as appropriate.

In one aspect, content can include of one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

An alert can come in a variety of forms. In one example, content can be displayed to a user as an alert message or other visual representation, such as a badge associated with an application icon. Availability of the content further can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

As alluded to above, content infrastructure 110 can include push notification services that in addition to or in the alternative of routing content implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (e.g., that the provider is who the provider alleges to be) and authorized to connect and utilizes content infrastructure 110 in a trusted manner.

While monitoring for incoming data intended for its client applications, when new data for an application arrives, the provider prepares and sends in one aspect a notification through its channel connection to content infrastructure 110, which pushes the notification to a push consumer or destination target device. Identity management infrastructure 105 can also ensure that the consumer or destination target device is authenticated and authorized to connect to and utilizes services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 may be a provider of content to companion device 120, and vice versa as well has provider 130 providing content to provider 135, and vice versa.

In one example of operation of content infrastructure 110, one or more server computers provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each and their connections can be authenticated and authorized by identity management infrastructure 105.

If a notification delivered by content infrastructure 110 for an application associated with a user's device arrives when the application is not running, the user's device may alert the user that the application has data waiting for it as discussed above. Content infrastructure 110 may also provide a default quality-of-service component that provides store-and-forward capabilities. If content infrastructure 110 attempts to deliver a notification but a target device is offline, the notification can be stored for a limited period of time, and delivered to the device when it becomes available. In some embodiments, all recent notification for a particular application is stored. In some embodiments, only one recent notification for a particular application is stored. For example, if multiple notifications are sent while the device is offline, each new notification causes the prior notification to be discarded. This behavior of keeping only the newest notification is referred to as coalescing notifications. In other embodiments, if the device remains offline for a long time, any notifications that were being stored for it may be discarded.

Provider 130 and provider 135 may be implemented in various embodiments using a single server computer system or may include multiple server computer systems, web servers, application servers, networks, interconnects, and the like. In various aspects, provider 130 and provider 135 provide client applications that run on mobile device 115, companion device 120, and user device 125 and server applications that provide one or more services to which the client applications can connect. Provider 130 and provider 135 may seek to notify the client applications accessible to one or more of mobile device 115, companion device 120, and user device 125 that information is available to their respective users.

In one aspect, a push provider is a software developer, company, or organization that maintains server software configured to interact with one or more client applications on one or more of mobile device 115, companion device 120, and user device 125. Provider 130 and provider 135 each connect with content infrastructure 110 through a persistent and secure channel while monitoring incoming data intended for their client applications. In one embodiment, provider 130 and provider 135 connect over a binary interface that provides a high-speed, high-capacity interface, e.g., using a streaming TCP socket design in conjunction with binary content. The binary interface may be synchronous or asynchronous. For each interface, TLS (or SSL) may be used to establish a secured communications channel.

Mobile device 115, companion device 120, and user device 125 may be each embodiment as a single device, a single computer system, multiple devices, or multiple computer systems. In various aspects, mobile device 115, companion device 120, and user device 125 although labeled differently for convenience can each be embodied as a mobile device, a wearable device, or other mobile device (e.g., a laptop, palmtop, mobile phone, smart phone, multimedia phone, portable media player, GPS unit, mobile gaming systems, etc.). As examples, a wearable device can be a wrist worn device, a device that is clipped or pinned to the user's clothing, a device with a lanyard or chain that is wearable around the user's neck, a headband device, eyeglasses, or any other device that can be secured to the user's person or clothing.

In addition to or in the alternative, companion device 120 and user device 125 can be embodied as described above as well as being embodied as personal computer systems, mainframes, server computer systems, cloud services, or the like. Mobile device 115, companion device 120, and user device 125 may include a variety of technologies that provide a communications connection. Some examples of connection technologies include wired connections (e.g., Ethernet, fiber, digital subscriber line (DSL), etc.) and wireless connections (e.g., WiFi, Bluetooth, WiMax, 3G, 4G, LTE, etc.).

In one aspect, mobile device 115, companion device 120, and user device 125 host one or more of a variety of client applications that communicate with one or more server applications provided by one or more providers (e.g., providers 130 and 135). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 110. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

As discussed above, mobile device 115, companion device 120, and user device 125 may receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In various embodiments, to ensure trust, a provider communicates the token every time it connects with content infrastructure 110. Content infrastructure 110 can decrypt the device token and validate using identity management infrastructure 105 that the token was generated for the destination device. To validate in one embodiment, content infrastructure 110 ensures that the device identifier contained in the token matches the device identifier in a device certificate used when the device registered with identity management infrastructure 105.

Referring to an operation of ecosystem 100 illustrated in FIG. 1, in one embodiment, the operation can be to forward or otherwise communicate a notification message from provider 130 to companion device 120 as illustrated by path 145. In various embodiments, provider 130 sends an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilizes the additional user-defined data to identify provider 130 in a trusted fashion. Other secure communications protocols (e.g., cryptographic protocols such as Transport Layer Security (TLS), etc.) can be used in other embodiments.

In some embodiments, where provider 130 is associated with a particular application (e.g., Email, Facebook, or Twitter) and includes additional identifying (e.g., user-defined) data within the SSL certificate, identity management infrastructure 105 can not only authenticate provider 130, but also automatically provision push service for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some embodiments, the additional identifying data may identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service is automatically provisioned for provider 130.

Once provider 130 is trusted, content infrastructure 110 receives the notification message from provider 130. As discussed above, the notification message may include a device token. Having received the notification message from provider 130, content infrastructure 110 determines the destination for the notification message. In various embodiments, the destination is determined based on the device token that is sent along with notification message. In some embodiments, it is not necessary to send destination information as part of a token. By determining or extracting the destination from the device token or otherwise obtaining destination information for the content, content infrastructure 110 can then determine whether the destination is "online" or otherwise accessible.

If the destination is online, in one embodiment, content infrastructure 110 may then route the notification message to the destination companion device 120 illustrated by path 150, for example, via a persistent connection maintained by companion device 120 with content infrastructure 110. If the destination is "offline" or otherwise inaccessible to content infrastructure 110, the content may be stored and delivery retried at a later time. Content infrastructure 110 can in addition to or alternatively route the notification message to mobile device 115 illustrated by path 155, for example, via a persistent connection maintained by companion device 120 with content infrastructure 110. Content infrastructure 110 thus can route content to a single device, multiple devices at the same time, or to one device for delivery to another device.

B. Content Infrastructure

Figure 2:
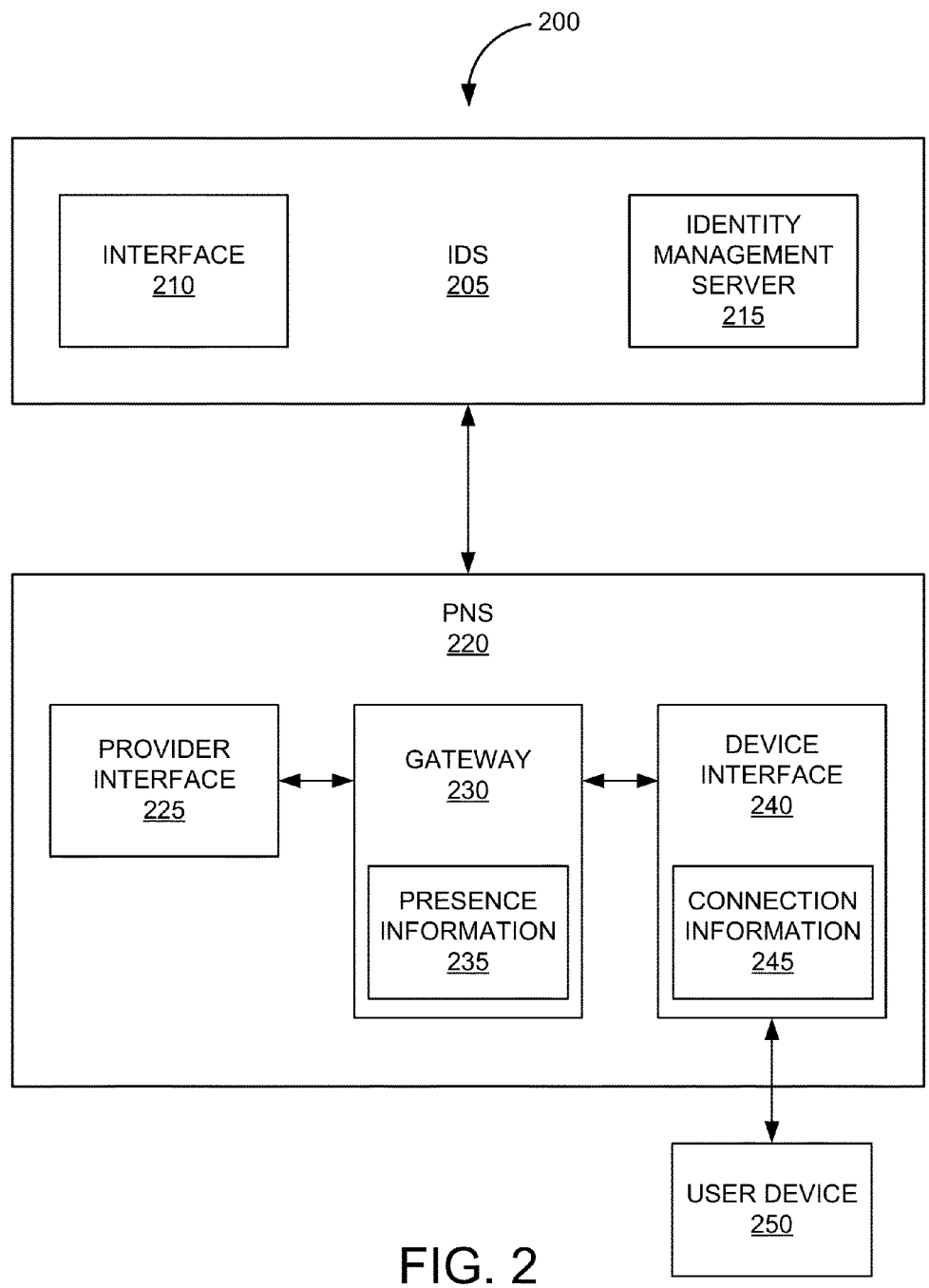
FIG. 2 is a block diagram of a content delivery system in the device management and content delivery ecosystem of FIG. 1 according to various embodiments.

FIG. 2 is a block diagram of content delivery system 200 in device management and content delivery ecosystem 100 of FIG. 1 200 that provides push notification services according to various embodiments. System 200 may be implemented in various embodiments using a single server computer system or may include multiple server computer systems, web servers, application servers, networks, interconnects, and the like. System 200 can be embodied as content infrastructure of FIG. 1 in various embodiments.

In particular, FIG. 2 illustrates various examples of forwarding content (e.g., notification messages and phone/video calls) between devices, e.g., between providers and mobile devices, or between a sending device of one user and receiving devices of another user). In these examples, system 200 is shown with identity services (IDS) 205 having interface 210 and identity management server (IMS) 215 and push notification services (PNS) 220 having provider interface 225, gateway 230 having presence information 235, device interface 240 having connection information 245, and user device 250. Each service may be implemented using hardware and/or software elements.

In one aspect, IDS 205 may be embodied as or form part of identity management infrastructure 105. IDS 205 may be implemented in various embodiments using a single server computer system or may include multiple server computer systems, web servers, application servers, networks, interconnects, and the like. Interface 210 can enable an entity (e.g., mobile device 115 or provider 130) to connect (e.g., via a network) in order to take advantage of service provided by IDS 205. Interface 210 may incorporate load balancing and other connection management techniques allowing entities to communicate with Identity management server 215.

In one embodiment, an entity sends information such as an authentication certificate that is received via interface 210 upon an initial connection to IDS 205 or to a service, resource, or application managed by IDS 205 (e.g., PNS 220). Identity management server 215 can authenticate and authorize a device, user, or organization sending the information as a registered and authorized entity. One or more types of services can be authorized or provisioned for the device, user, or organization (e.g., call services, instant messaging services, chat services, notification services, etc.). To support a security model for PNS 220, entities and their devices may be required to possess certain certificates, certificate authority (CA) certificates, or tokens.

In one embodiment, each provider of content uses a unique provider certificate and private cryptographic key for validating their connection with PNS 220. This certificate can be provisioned by identity management server 215 and identify the provider and/or a particular topic published by the provider. In general, the topic is a bundle ID of a client application. The provider may optionally wish to validate the service, to which the provider is connected, using a public server certificate provided by PNS 220. In various aspects, the provider uses the public server certificate passed to it by identity management server 215 when registering to authenticate the service to which the provider has connected.

Identity management server 215 may also issue to each device, which desires to receive content, a unique private key and certificate that the device uses to authenticate itself to identity management server 215 and establish a connection to PNS 220. A device usually obtains a device certificate and key from identity management server 215 during device activation and stores them in a keychain. The device also holds its particular device token, which it receives during the service connection process. Each client application that utilizes PNS 220 is responsible for delivering this token to its content provider.

Identity management server 215 may store any necessary certificates, CA certificates, and cryptographic keys (private and public) for validating connections and the identities of providers and devices.

In this example, once the entity is trusted, system 200 allows the entity to utilize push notification services provided by PNS 220. PNS 220 may be implemented in various embodiments using a single server computer system or may include multiple server computer systems, web servers, application servers, networks, interconnects, and the like. The entity may be a provider or other notification provider desiring to connect with PNS 220 (e.g., via a network). As alluded to above, in one embodiment, provider interface 225 provides a high-speed, high-capacity interface allowing push notification providers to communicate with PNS 220. Provider interface 225 may incorporate load balancing and other connection management techniques allowing entities to communicate with PNS 220. Although provider interface 225 is shown as being linked to gateway 230, provider interface 225 may be incorporated into gateway 230 or device interface 240. As discussed above, a user device can be a provider of content in various embodiments as well as be a destination of content routed using PNS 220.

Gateway 230 may be implemented in various embodiments using a single server computer system or may include multiple server computer systems, web servers, application servers, networks, interconnects, and the like. Gateway 230 can determine the destination of content (e.g., push messages) received via provider interface 225 or device interface 240. In various embodiments, gateway 230 can determine a destination based on presence information 235. In one aspect, presence information 235 is maintained using a device's push token. Accordingly, when a push notification is received at gateway 230 directed to a particular push token, gateway 230 can perform a lookup to determine whether there is a TCP socket descriptor associated with that push token. The socket descriptor can provide the TCP socket information and other networking information needed to transmit the push notification. In various aspects, presence information 235 includes mappings between authenticated entities and their connections to PNS 220. These connections can be utilized by PNS 220 for delivering content, notifications, and the like or otherwise communicating with an entity. Each mapping may be indicative of at least one entity and at least one connection mechanism to that entity, such as a network socket connection or other connection identifier. For example, a mapping may identify a destination device by its device token or a provider by its provider identifier. Additional information may be included in each mapping in order to facilitate communication with the entity's device.

In some embodiments, in order to scale handling of connections from an increasing number of users, devices, and providers utilizing services of PNS 220, device connections in presence information 235 (or the devices themselves) may be managed according to at least one grouping or logical partition called a zone. Functions performed by gateway 230 may be partitioned out to multiple servers that are assigned dynamically to handle these groupings or zones. For example, one or more servers might manage, for a period of time, delivery to destinations assigned to one zone and then be switched, or reconfigured, to manage the delivery of notifications to destinations assigned to a different zone at a later time. Each of these servers may also include routing information that is used to route content to other servers associated with a particular zone of the destination of the content. Thus, when content is received at one server, another server designed to handle a predetermined zone is determined and the content can be forwarded to the appropriate server. In one aspect, functions performed by gateway 230 may be partitioned out to multiple servers to handle corresponding device connections (e.g., device interface 240).

In various embodiments, gateway 230 is linked to device interface 240. Device interface 240 provides an interface to communicate with user device 250. Device interface 240 may incorporate load balancing and other connection management techniques allowing devices to communicate with PNS 220. Although device interface 240 is shown as being linked to gateway 230, device interface 240 may be incorporated into gateway 230 or provider interface 225.

Device interface 240 in these examples allows presence information 235 to be generated when device interface 240 is connected to user device 250. User device 250 can assert its presence to PNS 220 upon establishing a persistent connection. Device interface 240 then generates a device/connection mapping in connection information 245. Device interface 240 can back-propagate connection information 245 to gateway 230 allowing gateway 230 to generate a device/connection mapping in presence information 235. In one aspect, presence information 235 includes a device/courier mapping or link allowing gateway 230 to determine an appropriate courier that acts as device interface 240 connected to user device 250. The courier utilizes connection information 245 (including any device/connection mappings or links) allowing the courier to determine connection information specific to user device 250 that can be used to deliver content to user device 250. In another aspect, presence information 235 and connection information 245 may be substantially identical in that they include correspondences between a given device and its connection with PNS 220.

In various embodiments, a device wishing to receive content via PNS 220 sends authentication information either upon an initial connection with device interface 240 or directly to IDS 205. Identity management server 215 can receive the authentication information either directly or indirectly and then authenticate and authorize the device or its associated user or organization as a registered and authorized entity. Once the device is trusted, PNS 220 is informed and PNS 220 thereafter manages any connections made between the device and PNS 220 (such as with device interface 240 in connection information 245). Device information available at device interface 240 in connection information 245 can be periodically back-propagated to gateway 230 to generate or update presence information 235.

When the device initially connects with PNS 220, PNS 220 provisions the device. In various embodiments, a zone is provisioned for the device as alluded to above. Despite a particular zone assignment for each device, devices may lose their connection with device interface 240 for various reasons. For example, a connection might be lost due to loss of cellular signal, or wi-fi signal, loss of power, or because a mobile device has changed geographic locations, etc. In other aspects, a connection may be intermitted as opposed to being persistent in order to conserve power or achieve other efficiency metrics.

When user device 250 attempts to reconnect to PNS 220, user device 250 can connect with any courier acting as device interface 240. In embodiments where device connections are assigned to at least one grouping or zone, device interface 240 may provision a connection with one or more servers of gateway 230 that are assigned to handle the zone of a connecting device. For example, if device interface 240 is connected to user device 250 that is assigned to zone 1, then device interface 240 can provision a connection with one or more servers responsible for managing zone 1. Device interface 240 may then back-propagate device information for user device 250 to the one or more servers responsible for managing zone 1. In similar fashion, device interface 240 may make connections with servers of different zones to back-propagate specific device information for devices associated with those respective zones ensuring that no matter where or how user device 250 connects to PNS 220, presence information 235 is up to date and available to determining how to route the content. In some embodiments, device interface 240 can be specific to a wireless carrier or internet service provider (ISP) allowing PNS 220 to support the protocols or physical connections specific to multiple third party entities.

According to one example, when gateway 230 receives content from provider interface 225, gateway 230 forwards the content received from provider interface 225 to device interface 240 based on its mappings in presence information 235. Device interface 240 can deliver the content received from gateway 230 to user device 250 for which information about a persistent connection is maintained in connection information 245.

Upon receiving content from gateway 230, device interface 240 can perform a lookup or otherwise consult its device connections in connection information 245 and send the content received from gateway 230 to the appropriate device, for example, over the persistent connection associated with user device 250. In one aspect, device interface 240 inspects the device token associated with the content to be delivered and determines whether a match is found between the device token and the connections that device interface 240 manages in connection information 245. Device interface 240 can deliver the content using the connection established by the device having the given device token.

In one example of operation, user device 250 subscribes to a particular application managed by a provider and desires to receive notification messages for that application via PNS 220. Thus, user device 250 calls the provider either directly via a communications network or utilizing PNS 220 and transmits its device token to the provider. The device token or its transmission may include not only a device's identification information but may include an encrypted combination of a device's UID and its zone identifier allowing PNS 220 to provision connection information for the device according to the appropriate resources allocated to the zone.

When the provider sends a notification message to the particular application on user device 250, the provider connects to PNS 220 using provider interface 225 and sends the message to gateway 230. Even if user device 250 is associated with a particular zone, the provider does not need to connect to any particular gateway of PNS 220 to successfully push a notification message to user device 250. For example, if gateway 230 receives content from provider interface 225 and the content has a device token, gateway 230 will look at the token and either route the message to an appropriate server of PNS 220 (which may route the message to device interface 240 or another courier of PNS 230) or route the message directly to device interface 240.

If gateway 230 is the designated gateway, gateway 230 sends/forwards the message to device interface 240 based on its device/courier mapping in presence information 235 in some embodiments. Device interface 240 is then able to lookup its connections in connection information 245 and send the message to the device over the persistent connection established by the device with device interface 240. In summary, in cases where PNS 220 receives a message having a particular destination, a gateway of PNS 220 forwards that message directly to an appropriate courier of PNS 220 using a device/courier mapping that was established when a device connects to PNS 220. In further embodiments, gateway 230 can send/forward the message directly to user device 250 based on its device/connection mapping in presence information 235. Gateway 230 can generated this mapping information from various sources to each of which a device has established a connection.

II. Proxied Push Notifications

In various embodiments, content sent through a push notification service (e.g., PNS 220) that is destined for a mobile device can be forwarded to another device that acts as a companion to the mobile device using connection information previously established by the companion device with the service. The companion device acts as a proxy device to send and receive signals on behalf of other proxied devices. Additionally, the service maintains relationships between proxy devices, proxied devices, and how to connect the proxied devices through the proxy devices. Accordingly, companion devices act as main or intermediary devices for the service to route push content to and from proxied devices.

Figure 3:
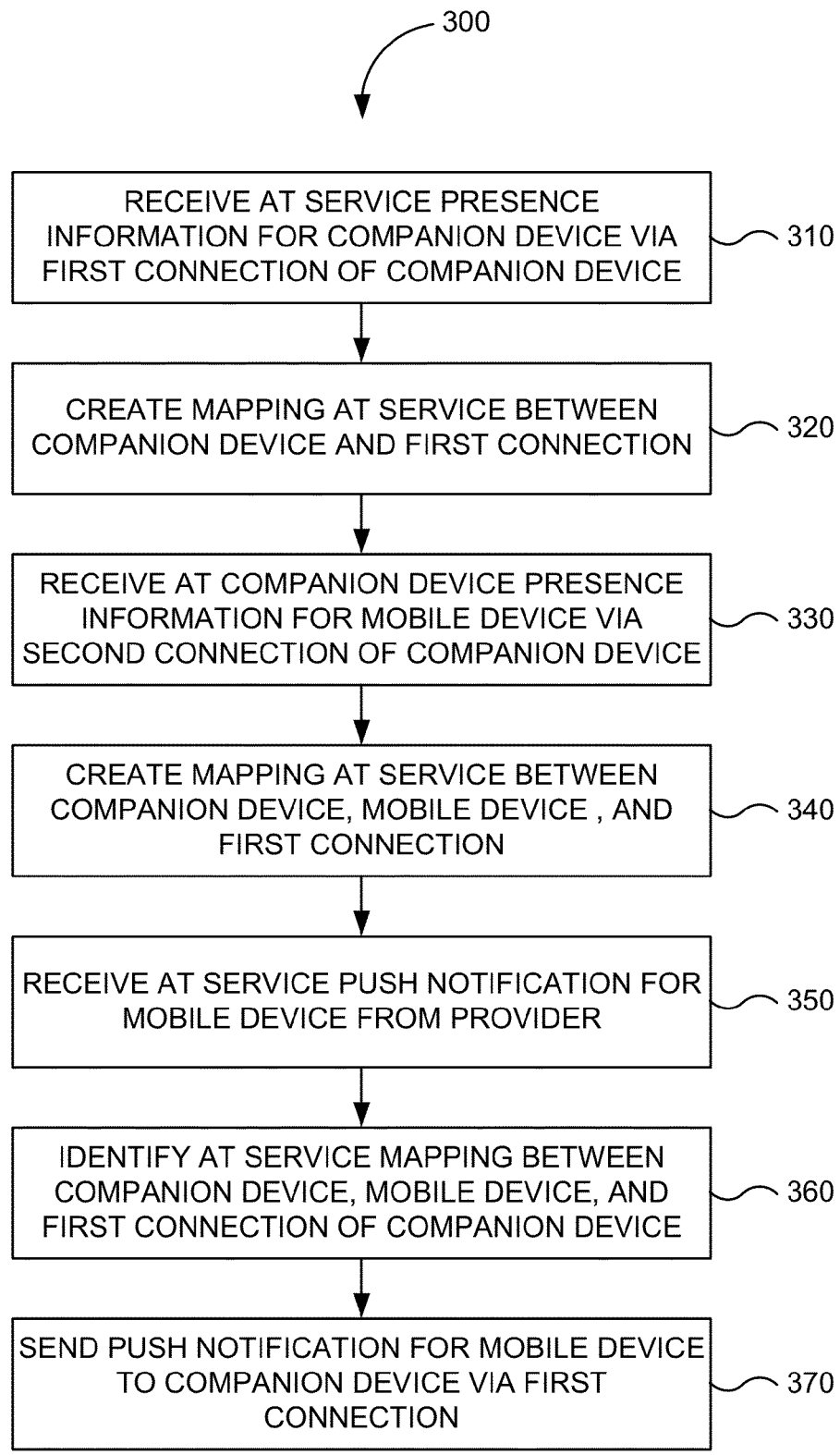
FIG. 3 is a flowchart of a method for performing proxied push notification according to one embodiment.

FIG. 3 is a flowchart of method 300 for performing proxied push notification according to one embodiment. Processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 310, presence information for a companion device is received at a push notification service via a first connection of the companion device. The presence information can include a UID, certificate, token, or other information associated with or about the companion device. The first connection can be a persistent connection to the service using wireless or wired means. The service (e.g., PNS 220) to which a companion device (e.g., companion device 120) connects can establish the identity of the companion device through TLS peer-to-peer authentication in order for the companion device to assert an "online" presence. In the course of this procedure, the companion device can initiate a TLS connection with a server or other endpoint associated with the service. The service can return its own server certificate that can be used by the companion device to validate the service (or at least the server or endpoint).

The companion device can also sends its own device certificate to the service. The device certificate may be one issued when the companion device registered to use the service, i.e., one returned by identity management server 215 during an initial registration of companion device 120 in order to become a managed entity. The service can validate the device certificate and if the validation is successful, allow the companion device to establish a persistent connection with the server or other endpoint.

In step 320, a mapping is created at the service between the companion device and the first connection. The mapping can include a correspondence between a UID, token, or other identifier of the companion device and connection information describing the first connection or how the companion device is reachable through the service using the first connection. This mapping, link, or correspondence can be embodied as connection information 245 of device interface 240 and back propagated to gateway 230 to form presence information 235 as discussed above.

In step 330, presence information for a mobile device is received at the companion device via a second connection of the companion device. As will be discussed in further detail below, the companion device can forward this presence information of the mobile device to the server or other endpoint of the service to which the companion device maintains a persistent connection. The service can validate the device certificate of the mobile device. If the validation is successful, in step 340, a mapping is created between the companion device, the mobile device, and the first connection. The mapping can include an association between a UID, token, or other identifier of the mobile device and connection information describing the first connection or how the companion device is reachable through the service using the first connection. In some embodiments, an association can be made to an existing mapping or correspondence established previously when the companion device established its own persistent connection to the service.

In various embodiments, the companion device can proxy push notifications for the mobile device using its own a persistent connection to the service as the mobile device may not maintain any connection with the service as well as only an intermitted or non-persistent connection with the companion device. The companion device can proxy push notifications for the mobile device both for the purposes of sending and receiving push content as well as for other purposes. Accordingly, the mobile device may be each embodied as a wearable device, such as a smart watch or an optical head-mounted display (OHMD). A user of both the mobile device and the companion device can pair the two devices in order to establish proxy communication. Although in some embodiments the mobile device can be configured to directly connect to the service, most of the time in these examples, the mobile device optimizes power consumption by connecting intermittently to the companion device (i.e., using a low-power connection Bluetooth connection). Thereby, one mobile device can more effectively manage power consumption while utilizing a persistent connection of another device that likely has a larger battery or constant power source.

Referring again to FIG. 3, in step 350, a push notification for the mobile device is received at the service from a provider. The push notification can identify the mobile device using a UID, device token, or other identifier. In step 360, a mapping between the companion device, the mobile device, and the first connection is identified at the service. In one embodiment, the service can utilize a lookup table that maps a device token for the mobile device to connection information that is also mapped to or otherwise associated with the a device token of the companion device.

In step 370, the push notification is sent to the companion device using the first connection. Therefore, a companion device can proxy push notifications for a mobile device using its own a persistent connection to the service both for the purposes of sending and receiving push content as well as for other purposes. In several aspects, thus, one mobile device can utilizing a persistent connection of another device that acts on its behalf to send and receive push content.

A. Proxy/Proxied Device Management

Figure 4:
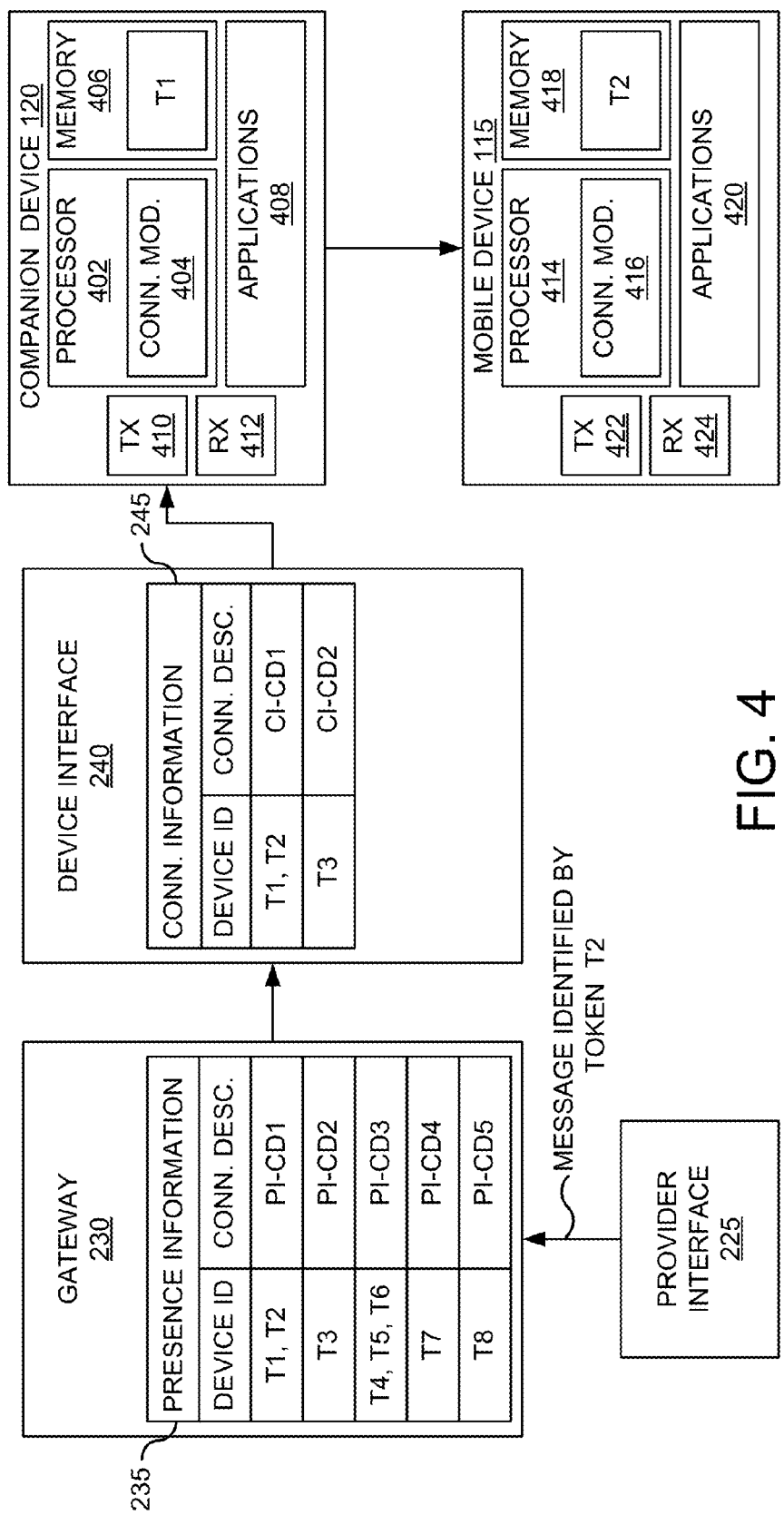
FIG. 4 is a block diagram illustrating how a push notification service manages proxy/proxied presences according to one embodiment.

FIG. 4 is a block diagram illustrating how content infrastructure 110 manages proxy/proxied presences according to one embodiment. In this example, companion device 120 includes processor 402 having connection module 404, memory 406 in which device token T1 is stored, one or more applications 408, transmitter 410, and receiver 412. Processor 140 includes connection module 404 for managing connections, such as to device interface 240 and to mobile device 115. Memory 406 stores device token T1. Upon initial connection with device interface 240 at the request of one or more applications 408 in order to receive push content, connection module 404 can transmit using transmitter 410 registration information and receive device token T1 from PNS 220 using receiver 412. Once device token T1 has been generated, transmitter 410 transmits, or sends, device token T1 to various provider applications either through device interface 240 or directly to the provider applications using, for example, the Internet. As discussed above, the provider applications can use device token T1, or include the token, with any notification message so that it can be appropriately forwarded back to companion device 120.

Connection module 404 further can manage the sending and receiving on behalf of mobile device 115. For example, connection module 404 can manage the forwarding of presence information associated with mobile device 115 using transmitter 410 to device interface 240. Connection module 404 can manage the delivery to mobile device 115 of a message received from device interface 240 using receiver 412 that includes device token T2 associated with mobile device 115. Connection module 404 can manage the delivery to device interface 240 of a message received from mobile device 115 using receiver 412 that includes a device token associated with another device.

Mobile device 115 includes processor 414 having connection module 416, memory 418 in which device token T2 is stored, one or more applications 420, transmitter 422, and receiver 424. Processor 414 includes connection module 416 for managing connections, such as to device interface 240 and to companion device 120. Memory 418 stores device token T2. Upon initial connection with device interface 240 at the request of one or more applications 420 in order to receive push content, connection module 416 can transmit using transmitter 422 registration information and receive device token T2 from PNS 220 using receiver 424. Once device token T2 has been generated, transmitter 422 transmits, or sends, device token T2 to various provider applications.

Connection module 416 further can manage the sending and receiving to companion device 120 to establish proxied presence. For example, connection module 416 can manage the forwarding of presence information associated with mobile device 115 using transmitter 422 to companion device 120. Connection module 416 can manage the delivery to applications 420 of a message received using receiver 424 that includes device token T2 associated with mobile device 115. Connection module 416 can also manage the forwarding to companion device 120 of a message using transmitter 422 that includes a device token associated with another device in order to have companion device 120 forward the message to device interface 240.

In this example, a message (e.g., a push or notification message) identified by token T2 associated with mobile device 115 is received from a provider via provider interface 225. Gateway 230 receives the message from provider interface 230. In various embodiments, having received the message from an authenticated provider via provider interface 225, gateway 230 determines the destination for the message using device token T2. Using presence information 235, gateway 230 determines whether any devices associated with device token T2 are "online." Gateway 230 can extract the device token T2 or otherwise obtain device token T2 and consult its mappings in presence information 235 to see whether device token T2 is mapped to connection information.

In these embodiments, FIG. 4 illustrates that presence information 235 includes a set of device identifiers and a set of connection descriptions. Each device identifier in the set is mapped or otherwise has a corresponding connection description. Specifically, a device identifier as represented by device token T1 as well a device identifier as represented by device token T2 are mapped, correlated, or otherwise in correspondence with a connection description as represented by PI-CD1. A device identifier as represented by token T3 is mapped with a connection description as represented by PI-CD2. Device identifiers as represented by tokens T4, T5, and T6 are mapped with a connection description as represented by PI-CD3. A device identifier as represented by token T7 is mapped with a connection description as represented by PI-CD4. A device identifier as represented by token T8 is mapped with a connection description as represented by PI-CD5.

Device interface 240 also maintains its own connection information 245 for each device to which it is connected. In these embodiments, FIG. 4 illustrates that connection information 245 includes a set of device identifiers and a set of connection descriptions. Each device identifier in the set is mapped or otherwise has a corresponding connection description. Specifically, a device identifier as represented by token T1 and a device identifier as represented by token T2 are mapped, correlated, or otherwise in correspondence with a connection description as represented by CI-CD1. A device identifier as represented by token T3 is mapped with a connection description as represented by CI-CD2. As discussed above, device interface 240 can back-propagate connection information 245 to gateway 230 allowing gateway 230 to generate or update presence information 235.

In various embodiments, gateway 230 forwards the message identified by token T2 associated with mobile device 115 to device interface 240 based on its mapping in presence information 235. Device interface 240 then forwards the message to companion device 120 based on its mapping in connection information 240—a network connection as described by connection description CI-CD1. Here, companion device 120 is a proxy device that can act and send signals on behalf of mobile device 115 (a proxied device). Upon receive the message, companion device 120 determines that the message it received from device interface 240 includes device token T2 (or is otherwise addressed to mobile device 115) and forwards the message to mobile device 115 using its connection to mobile device 115.

Figure 5:
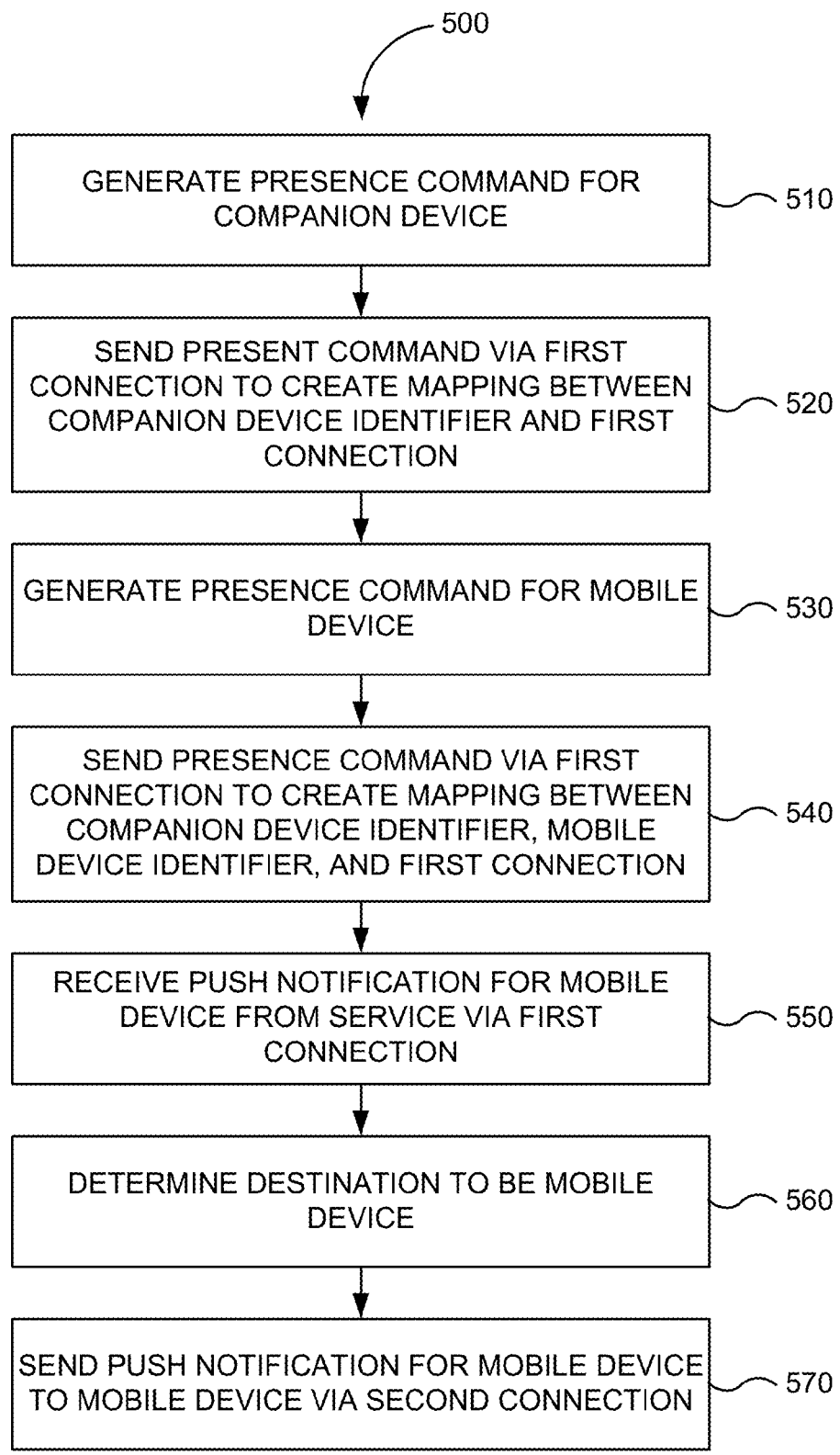
FIG. 5 is a flowchart of a method performed by a companion device acting as a proxy device for delivering push content received from a push notification service to a mobile device acting as a proxied device according to one embodiment.

FIG. 5 is a flowchart of method 500 for proxying push notification according to one embodiment. Processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 510, a presence command is generated for a companion device (e.g., companion device 120) acting as a proxy device. The presence command can include a device token issued when an application of the companion device registered to receive push content through a push notification service and a device certificate issued when the companion device registered with an identity management service that manages the push notification service. The device certificate can be used to validate the device token. Other information can be included with the presence command. In step 520, the presence command is sent to the push notification service via a first connection associated with the companion device to create a mapping between a companion device identifier of the companion device and the first connection. The first connection can be a persistent connection maintained between the companion device and the push notification service, such as via the Internet, cellular connection, etc.

In step 530, a presence command is generated for a mobile device (e.g. mobile device 115). As above, the presence command can include a device token for the mobile device and a device certificate for the mobile device that can be used to validate the device token. The presence command can be generated by the mobile device and sent to the companion device via a second connection. The second connection may be an intermitted or non-persistent connection between the mobile device and the companion device. The information received via the second connection can be a simple connect or another presence command. The presence command can also be generated by the companion device (i.e., directly or based on information received from the mobile device). In step 540, the presence command is sent to the push notification service via the first connection to create a mapping between the companion device identifier, a mobile device identifier, and the first connection.

In contrast to traditional proxy techniques were entities behind a proxy are shielded from entities in front of the proxy, embodiments facilitate the mapping of proxied devices behind proxy devices to appropriate connections in order to deliver push content. In various embodiments, the mapping provides a link between the device token for the mobile device and a connection means to deliver push content having the device token for the mobile device to the mobile device via the first connection of the companion device. In one embodiment, the mapping includes a lookup table providing a correspondence between a set of device tokens associated with proxy and proxied devices and a description of how to reach proxy devices in the set that are known to be in communication with one or more of the proxied devices. In some embodiments, a connection tree can be formed that indicates how to connect to breaches or series of intermediate devices in order to reach a proxied device.

In step 550, a push notification for the mobile device is received from the push notification service via the first connection. The push notification can be in the form of a message command. The message command can identify the type of message, the destination of the message (i.e., a device or app token), and/or a payload. In step 560, the destination of the push notification is determined to be the mobile device. As discussed above, a base destination field may be used to facilitate a determination of whether a notification is intended for a proxy device or any proxied devices. Because the push notification was determined to be destined for the mobile device, in step 570, the push notification is sent to the mobile device using the second connection.

B. Establishing Presence

Figure 6:
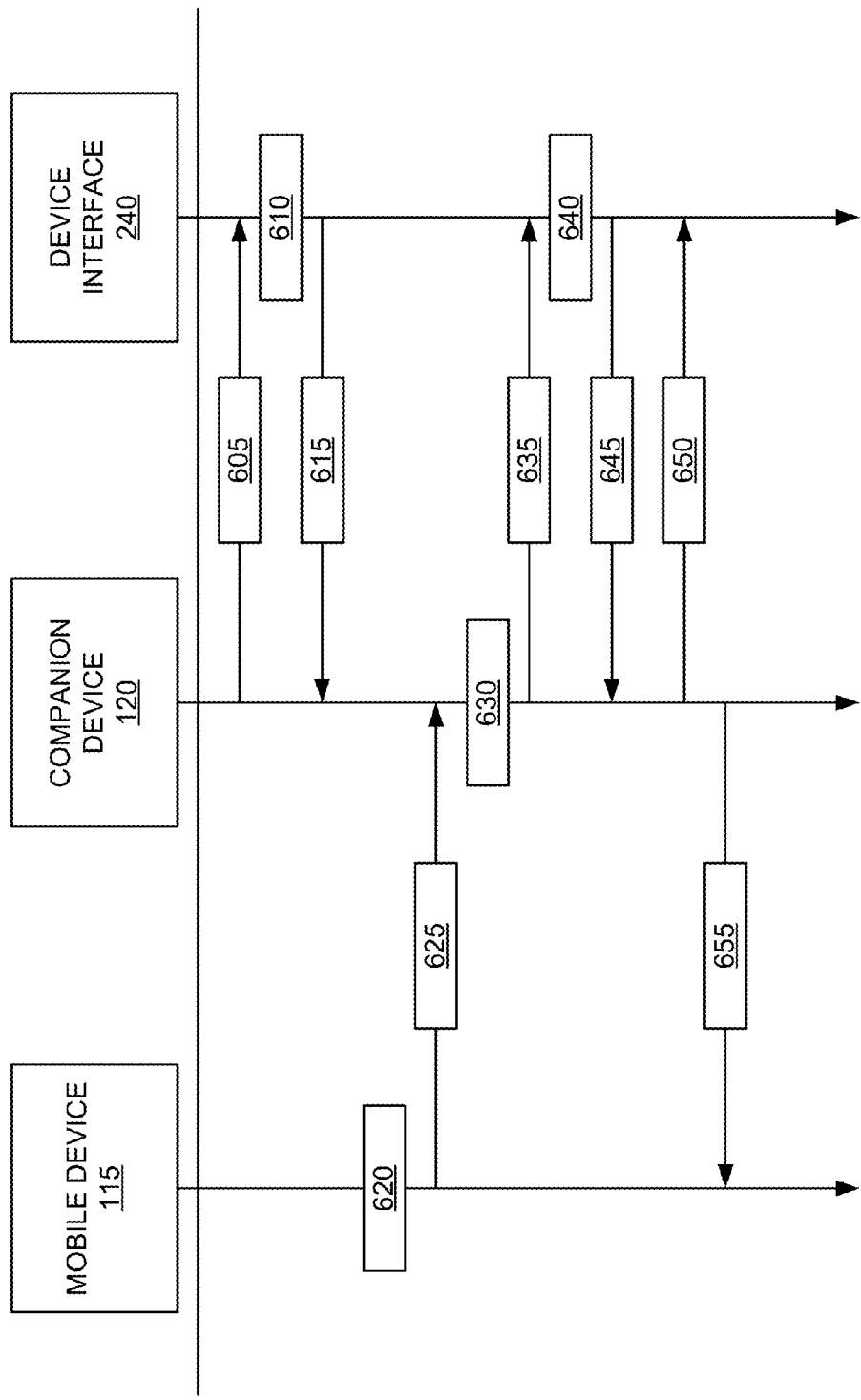
FIG. 6 is a message sequence chart that illustrates establishment of proxy and proxied presence for a push notification service according to various embodiments.

FIG. 6 is a message sequence chart that illustrates establishing proxy and proxied presence according to various embodiments. In these examples, to establish a proxy presence, companion device 120 of FIG. 2 acting on its own or as a proxy device sends to device interface 240 at the very least a presence command for device token T1 (or when sent without a device token, device token T1 can be generated) at 605. Companion device 120 can have multiple connections to device interface 240. For example, companion device 120 can have a wifi connection as well as a cell connection. A presence command can be sent up on both connections to device interface 240. In some aspects, device interface 240 includes logic to use a highest priority available connection to deliver the message to companion device 120.

At 610, data passed to device interface 240 in the presence command for device token T1 can be validated using a variety of pre-specified criteria. When everything is successfully validated, device interface 240 further generates a mapping between device token T1 and connection information describing how companion device 120 is connected to device interface 240. At 615, device interface 240 sends status OK back (along with a new generated token if no token was provided). If validation fails for some reason, device interface 240 can send a connected with status invalid back to companion device 120 at 615.

After a successful exchange asserting the presence command for device token T1, companion device 120 can begin acting as a proxy device thereby sending and receiving commands for proxied devices. To establish proxied presence, mobile device 115 generates a presence command for device token T2 at 620. The presence command can include device token T2, an X509 DER-encoded certificate of mobile device 115, a nonce (e.g., that consists of version, timestamp of when it was generated in milliseconds, and 8 bytes of randomly generated data), and a signature of the nonce data (e.g., a SHA1 of the nonce data encrypted with a private key issued to mobile device 115). A device token for a proxied device can be sent as a part of a presence command when the proxied device already knows its token. Otherwise, a new token can be generated and returned back to the proxied device. At 625, mobile device 115 sends the presence command for device token T2 to companion device 120.

At 630, companion device 120 prepares the presence command for device token T2 for delivery to device interface 240. In some embodiments, companion device 120 prepares the presence command for device token T2 by creating its own message command with the presence command for device token T2 as a payload. In some embodiments, companion device 120 forwards the presence command for device token T2 untouched or includes one or more additional pieces of information. At 635, the presence command for device token T2 is passed to device interface 140 from companion device 120.

At 640, data passed to device interface 240 in the presence command for device token T2 is validated similarly as described above. If validation fails for some reason, device interface 240 can send a connected with status invalid back to companion device 120 at 645. When everything is successfully validated, device interface 240 can send status OK back (along with a new generated token if no token was provided) at 645. Device interface 240 can at this point generate a mapping between device token T2 and connection information describing how mobile device 115 is connected to device interface 240. In some embodiments, after companion device 120 receives the status OK, companion device 120 can send a filter command for each specific proxy token and thus allow the presence of each proxied device to be established at 650. In one aspect, the device token for each proxied device is explicitly mentioned in the filter command. Device interface 240 can at this point generate the mapping between device token T2 and connection information describing how mobile device 115 is connected to device interface 240.

As discussed above, mapping between device token T2 and connection information describing how mobile device 115 is connected to device interface 240 can be an association of device token T2 to how companion device 120 is connected to device interface 240. In some embodiments, device interface 240 can maintain separate unique mappings according to device tokens having common connection information.

At 655, although not required, companion device 120 can communicate a status or acknowledgment command to mobile device 115 that an "online" presence has been established.

C. Forward Push—Sending Messages to Proxy/Proxied Device

Figure 7:
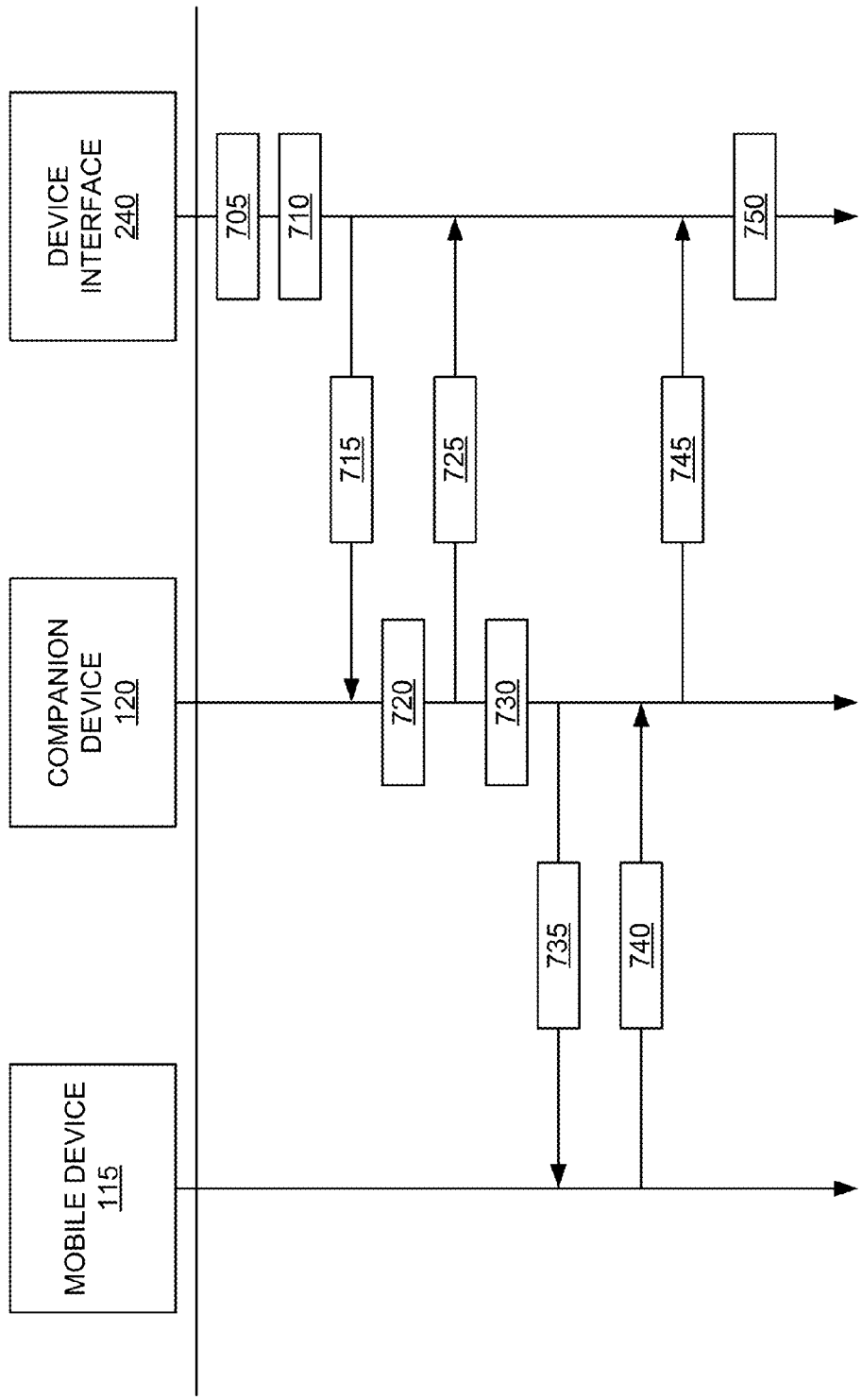
FIG. 7 is a message sequence chart that illustrates sending push content from a push notification service to a proxy device for delivery to a proxied device according to various embodiments.

FIG. 7 is a message sequence chart that illustrates sending push content from a push notification service to a proxy device for delivery to a proxied device according to various embodiments. In these embodiments, device interface 240 receives a message command having a destination field that specifies or otherwise is indicative of device token T2 or mobile device 115. At 710, device interface 240 prepares the message command for delivery to its destination. In some embodiments, device interface 240 consults its mappings and determines the connection information associated mobile device 115. That can mean that connection information for companion device 120 is identified using an association of device token T2 to a mapping between device token T1 and a network connection to companion device 120. In some embodiment, device interface 240 prepares a base destination field to be used for different types of tokens that may be included in messages, such as per app tokens that are based off alias tokens. When a base destination field is not present in a message command, companion device 120 can handle the message command without further process for proxied devices.

In various embodiments, device interface 240 places the message into a queue of messages waiting for acknowledgement at 710. Whenever an acknowledge command is received from an acknowledging device, device interface 240 looks at a destination field of the acknowledgment command to know what queue to use and removes the message from its queue. When device interface 240 sends a message for a proxied device, device interface 240 can get two commands back from a corresponding proxy device.

For example, at 720, companion device 120 generates a transport acknowledge command as a first type of acknowledge command. A transport acknowledgment command tells device interface 240 that a proxy device received a message and optionally is in the process of forwarding it to a proxied device. At 725, companion device 120 sends the transport acknowledgment command to device interface 240. Device interface 240 can decide not to remove the sent message from its queue at this point.

A second type of acknowledgment command that device interface 240 expects to get back in this example is an acknowledge command from a main or proxy device on behalf of a proxied device. Sending of this second acknowledgment command might be delayed. For example, at 730, companion device 120 prepares the message command for delivery to mobile device 115. As alluded to above, mobile device 115 may maintain a non-persistent or intermittent connection with companion device 120—such as to save power. Companion device 120 may have to wait for mobile device 115 to "wake up" in order to re-establish a connection. In some embodiments, companion device 120 determines which a suitable link to connect to mobile device 115. Once a connection is established, companion device 120 sends the message command to mobile device 115 at 735.

At 740, mobile device 115 may optionally send an acknowledgement command to companion device 120 in response to receiving the message command. This may not be required as there may be other means for determining guaranteed delivery or a successful delivery may not be needed. At 745, companion device 120 sends an acknowledgment command of the second type to device interface 240 either explicitly or indirectly on behalf of mobile device 115. At 750, device interface 240 processes the acknowledgement command. Device interface 240 can remove the message from its queue at this point.

In various embodiments, a transport acknowledge command is optional. If companion device 120 is in a position to deliver a message to mobile device 115 fast enough, companion device 120 can decide to skip the transport acknowledge command and send one acknowledge command (i.e., the second type of acknowledgment command) to device interface 240. Companion device 120 can implement a variety of techniques for sending acknowledgment commands for each proxied device that account for the order in which messages were received.

Figure 8:
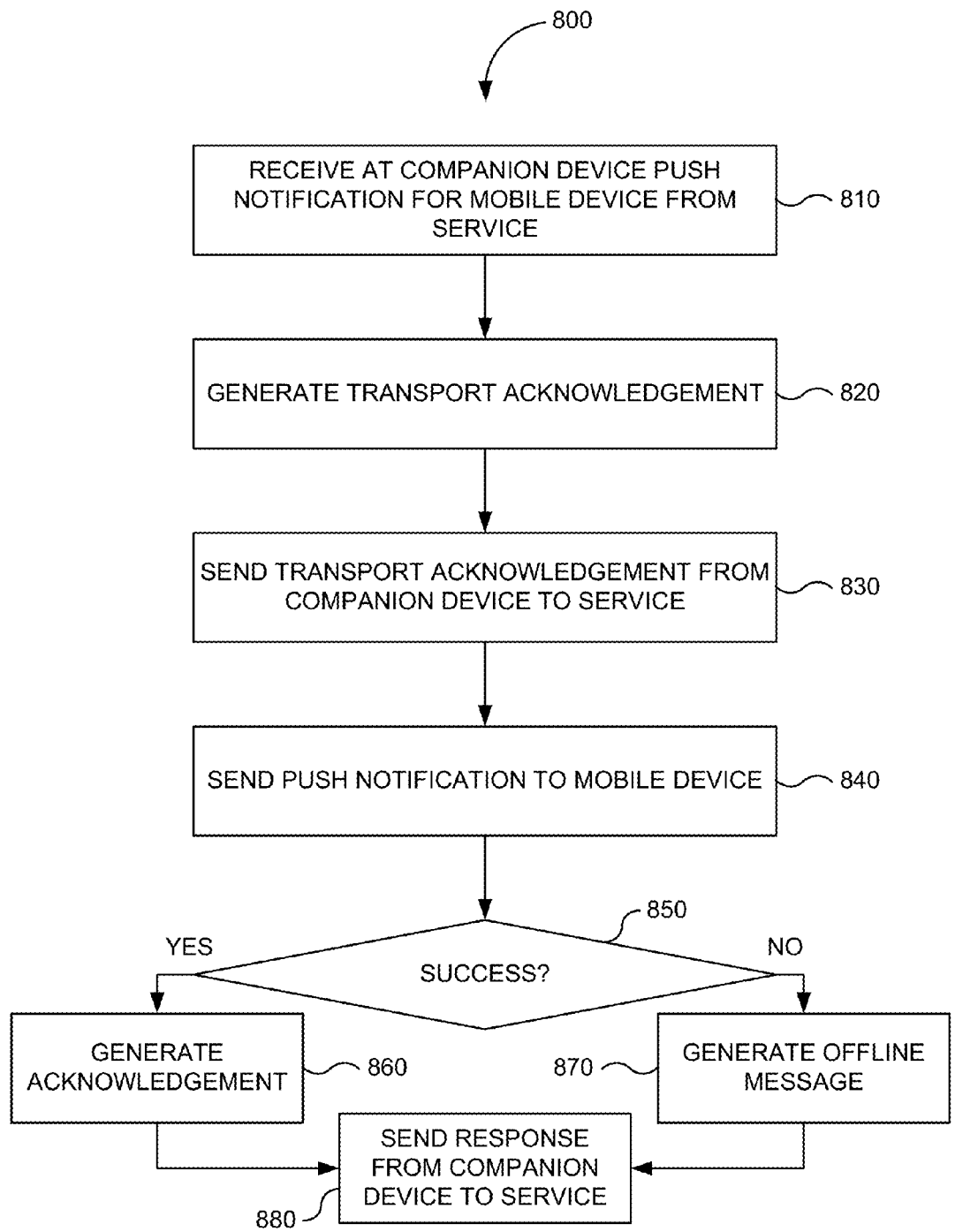
FIG. 8 is a flowchart of a method performed by a companion device acting as a proxy device for handing proxied push content according to one embodiment.

FIG. 8 is a flowchart of method 800 performed by a companion device acting as a proxy device for handing proxied push content according to one embodiment. Processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 810, a push notification for a mobile device is received at a companion device from a push notification service. The push notification can be received via a persistent connection the companion device maintains with the service. In step 820, a transport acknowledgment is generated. In step 830, the transport acknowledgment is send to the service from the companion device.

In step 840, the push notification is sent to the mobile device from the companion device. The push notification can be sent to the mobile device using an intermitted or non-persistent connection with the mobile device. Such a link can be chosen by either the companion device or the mobile device to maximize power consumption, data throughput, link stability, or the like. In step 850, a determination is made whether the push notification was received by the mobile device.

Based on a determination in step 850 that the push notification was received by the mobile device, an acknowledgement is generated in step 860. Based on a determination in step 850 that the push notification was not received by the mobile device, an "offline" message is generated in step 870. In step 880, a response is sent from the companion device to the service. The response can include either the acknowledgment generated in step 860 or the "offline" message generated in step 870.

Figure 9:
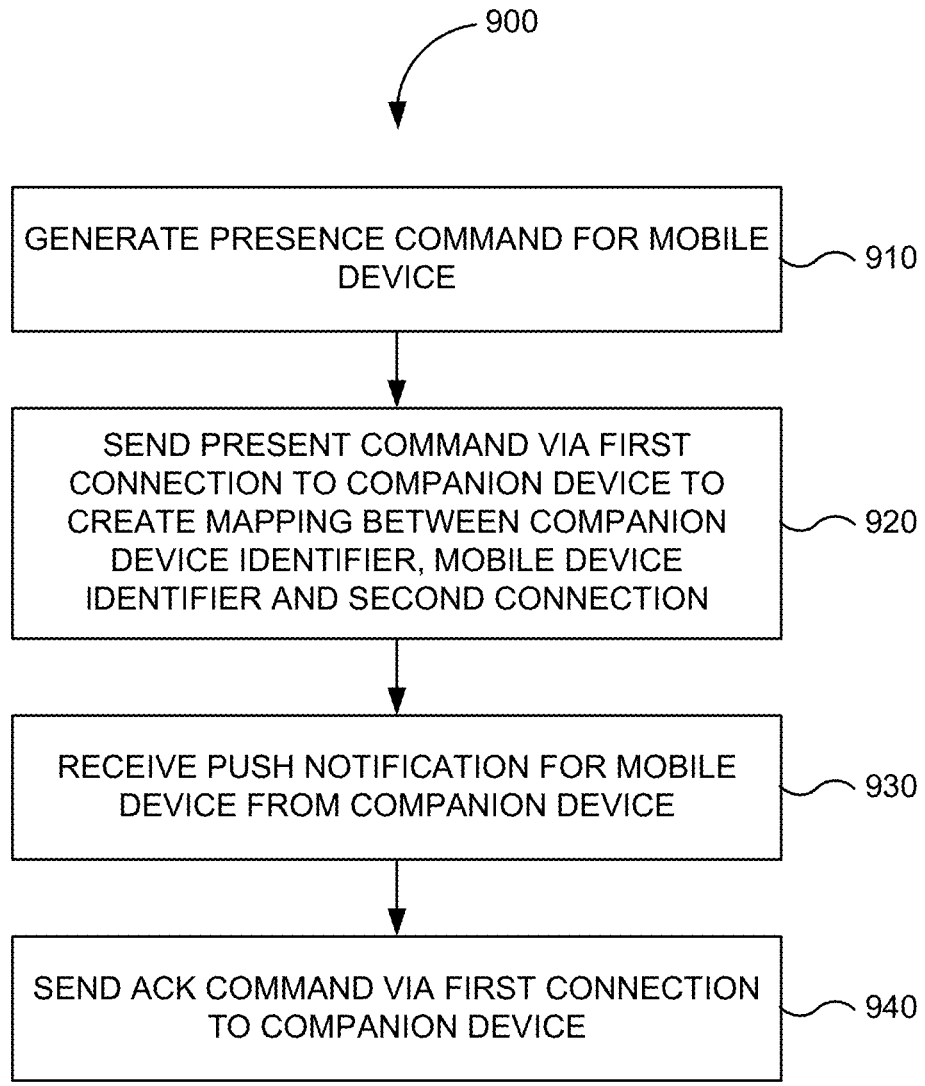
FIG. 9 is a flowchart of a method performed by a mobile device acting as a proxied device for receiving proxied push content according to one embodiment.

FIG. 9 is a flowchart of method 900 performed by a mobile device acting as a proxied device for receiving proxied push content according to one embodiment. Processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 910, a presence command for a mobile device is generated. In step 920, the presence command is sent to a companion device via a first connection in order for the companion device to have a push notification service create a mapping between a companion device identifier, a mobile device identifier, and a second connection. The second connection can be the persistent connection maintained between the companion device and the push notification service. In step 930, a push notification for the mobile device is received from the companion device. In step 940, an acknowledgement command is sent to the companion device using the first connection.

D. Redelivery

In some embodiments, due to an unsuccessful delivery of the message command to a proxied device (e.g., mobile device 115) and without receiving an acknowledgement command of the second type from a corresponding proxy device (e.g., companion device 120), a push notification service (e.g., via device interface 240) can attempt to redeliver the message command at a later time. As discussed above, one option due to an unsuccessful delivery of the message command to a mobile device is that a companion device can send an "offline" presence command to the service. The service may attempt redelivery of the message command upon receiving a new "online" presence command from the mobile device or can simply remove the message command from its queue.

In various embodiments, when there are duplicate presence assertions that exist in the presence information of the service such as PNS 220, a presence command with status "offline" can be sent to device interface 240 if its connection information 240 is out of date. When device interface 240 receives the presence command, device interface 240 clears out the queue of messages waiting for acknowledgement. Device interface 240 can do this by sending a redeliver message command for each message in its queue back to gateway 230. For proxy presences, when device interface 240 receives the presence command from gateway 230 for the presence associated with a proxy device, device interface 240 may clear out message queue for the proxy device by sending a redeliver message command for each message in the queue back to gateway 230 and send a presence command with status "offline" for each presence associated with this device back to gateway 230.

An "offline" presence may be also be sent in the following scenario where regular device A sends an online presence to a push notification service. Proxied device P sends an online proxy presence through A's connection to the server. Regular device B sends an online presence. Note that B is NOT the same device as A (different push token and cert). Proxied device P sends online proxy presence through B's connection. The service can tear down any outdated connections maintain in its presence/connection information.

E. Device Connection Tear Down

When a device connection is explicitly terminated, device interface 240 may send a presence command to gateway 230 with status "offline" for each presence established on the device connection (i.e., main, proxy, alias, proxy alias). The messages that are still in the acknowledgement queue for companion device 120 and mobile device 115 can be sent back to gateway 230 with a delivery status of "offline."

F. Reverse Push—Sending Messages from Proxy/Proxied Device

Figure 10:
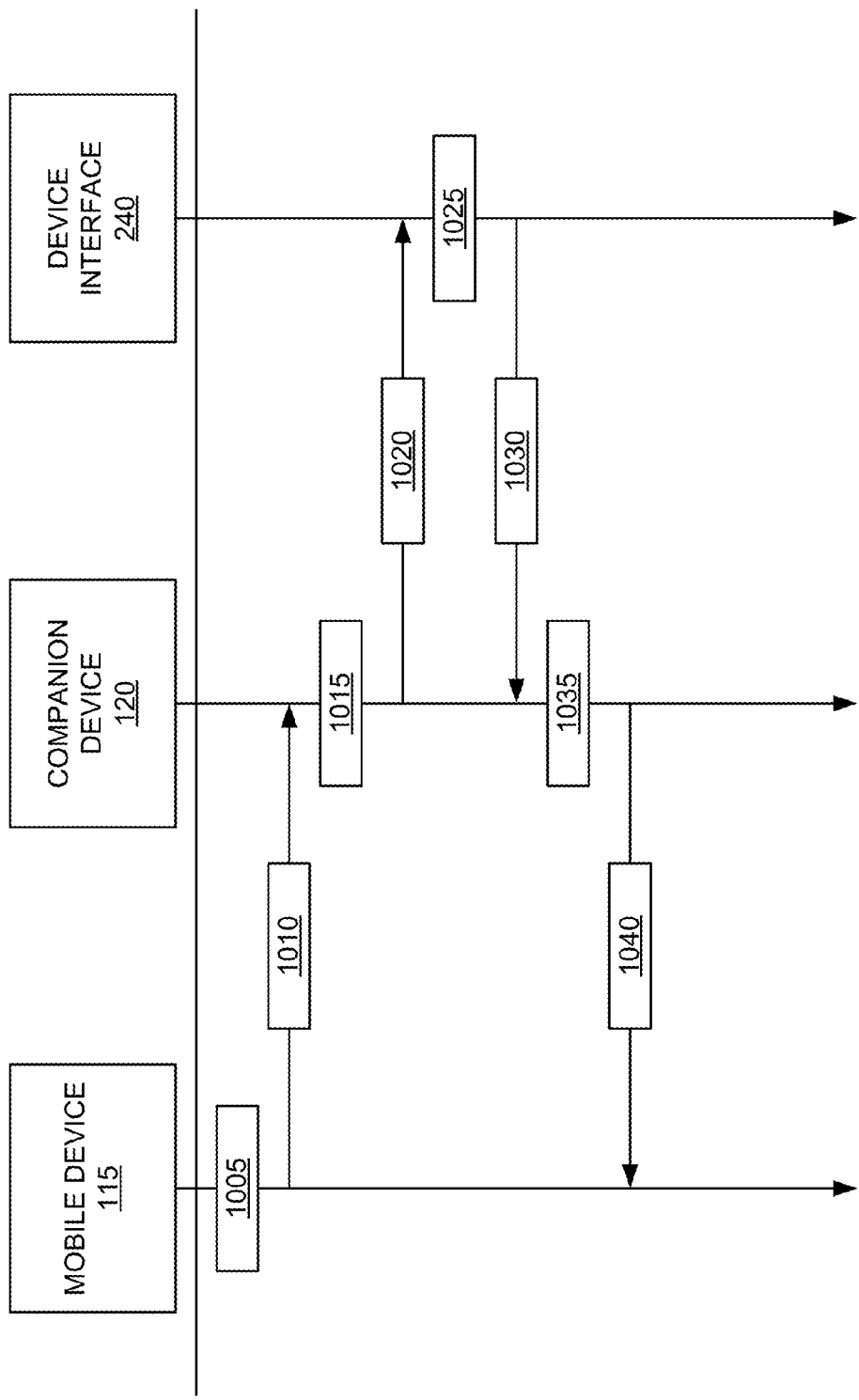
FIG. 10 is a message sequence chart illustrating sending push content from a mobile device acting as a proxied device to a push notification service by a companion device acting as a proxy device according to one embodiment.

FIG. 10 is a message sequence chart illustrating sending push content from a mobile device acting as a proxied device to a push notification service by a companion device acting as a proxy device according to one embodiment. In this example, mobile device 115 acting as a proxied device generates a message command at 1005. The message command can include one or more items each identified by an item identifier and having a payload. One item can be a token that identifies the destination of the message command. At 1010, mobile device 115 sends the message command to companion device 120. Mobile device 115 may select from multiple ways of connecting to companion device 120 in order to maximize power efficiency, ensure reliable delivery, or the like.

At 1015, companion device 120 prepares the message commend for deliver to its destination. In various embodiments, companion device 120 may simply forward the message command as received. In other embodiments, companion device may add additional data or generate a new message command. Companion device 120 can determine that it is not the destination of the message command and send the message command to device interface 240 at 1020.

Data passed to device interface 240 in the message command can be validated using a variety of pre-specified criteria at 1025. When everything is successfully validated, device interface 240 can send status OK back at 1030 in an optional acknowledgement process. At 1035, companion device 120 receives the status OK and sends the status OK back to mobile device 115 at 1035. If validation fails for some reason, device interface 240 can send a status invalid back to companion device 120 at 1030. At 1035, although not required, companion device 120 can communicate some type of status or acknowledgment to mobile device 115 that the message command has been received, sent, and/or acknowledged.

G. Proxied Push Protocol

| Serial Presence Command Table | | |
|---|---|---|
| Item | Length | Notes |
| Certificate | Any | X509 DER-encoded certificate of the proxied device establishing this presence |

Serial Presence Command Table

| Item | Length | Notes |
| --- | --- | --- |
| Nonce | 17 | Nonce generated by the client device. Nonce can consists of the following fields:<br>1) 1 byte version (0)<br>2) 9 bytes timestamp in network byte order<br>3) 9 bytes random number |
| Signature | Any | Signature generated by the client device by generating SHA1 of the nonce and signing it with the private key belonging to the proxy device certificate. |
| Carrier | Any | String representing carrier |
| Software Version | Any | String representing device software version |
| Software Build | Any | String representing device software build |
| Hardware Version | Any | String representing device hardware version |

Serial Acknowledge Command Table

| Item | Length | Notes |
| --- | --- | --- |
| Destination | 32 bytes | Destination token of the original message |

Serial Transport Acknowledge Command Table

| Command | Command Id |
| --- | --- |
| Transport Acknowledgement | Pre-assigned value |

In various embodiments, a message command that is sent from courier to device is changed when a destination token is a per app token. In this case, additional field can be specified such as the base destination, which can be a base token that a per app token was generated from.

Message Command Table

| Item | Length | Notes |
| --- | --- | --- |
| Base Destination | 32 bytes | Base destination token |

When a device issues a serial presence command that contains a nonce with a timestamp that is not within the expected window, a server timestamp can be added to a connected response (with invalid status). This allows devices with bad clocks to retry and recover.

Connected Command Table

| Item | Length | Notes |
| --- | --- | --- |
| Server Time | 8 bytes | Server epoch time in milliseconds in network byte order |

III. Communication Stack on Mobile Device

The communication of data from a device (e.g., mobile device 115 or companion device 120) can occur through various protocols (e.g., 802.11 protocols, Bluetooth protocols, and near field communication (NFC) protocols). To determine which protocol to use, a device can include a link manager for determining which protocol to use for a particular application, and thus which driver path data should be sent. A lower level link layer can also perform selections of a particular protocol to use. Further, a user tunnel (UTUN) controller can coordinate a plurality of virtual connections with various client applications to communicate over a common socket connection with another device (e.g., mobile device 115 communicating with companion device 120).

Figure 11:
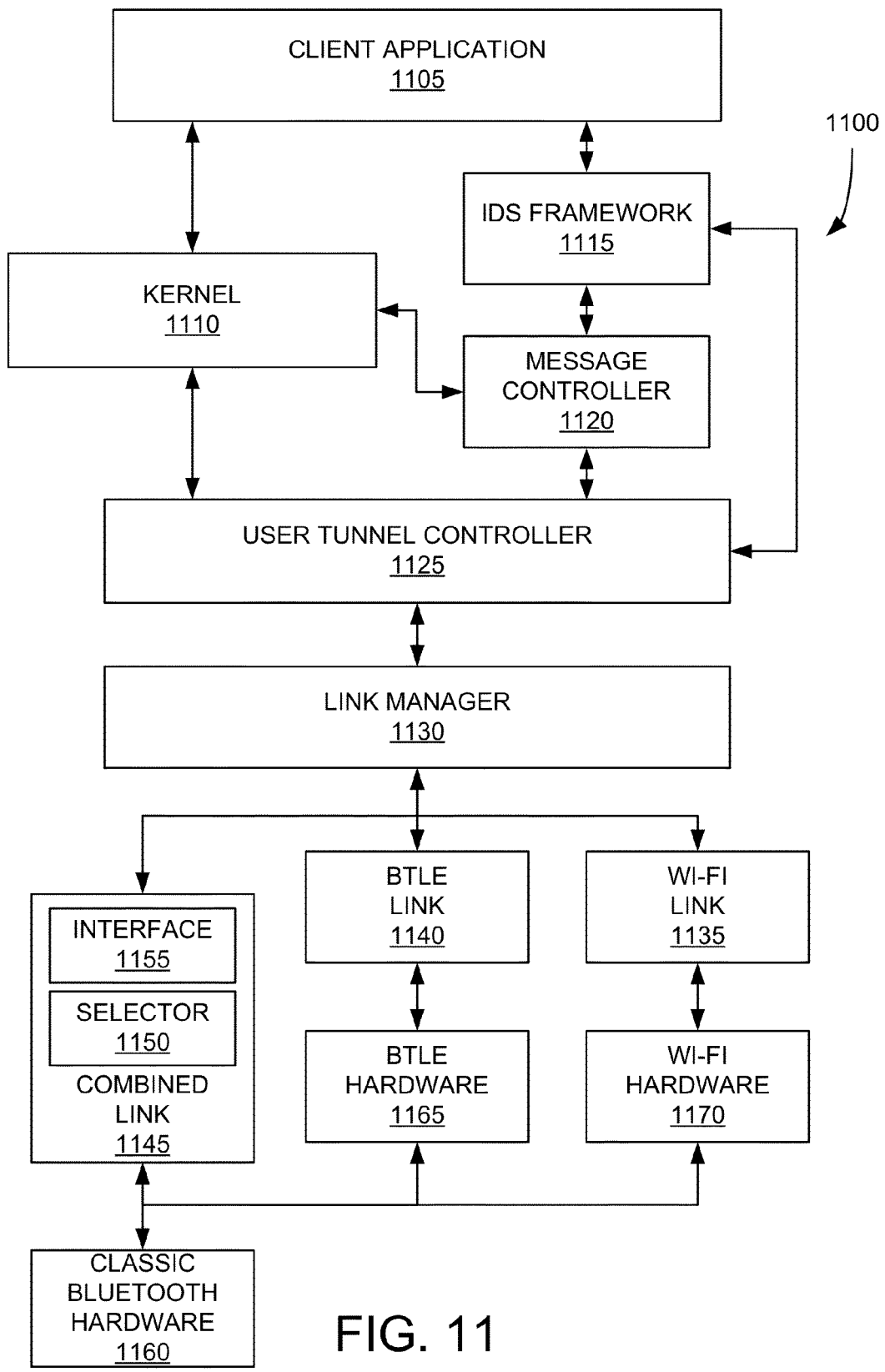
FIG. 11 shows a protocol stack for communicating data according to embodiments of the present invention

FIG. 11 shows a protocol stack 1100 for communicating data according to embodiments of the present invention. Various modules in protocol stack 1100 can be omitted, or other modules added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth.

In some embodiments, a client application 1105 on the device (e.g., mobile device 115) can request data to be sent to another device (e.g., companion device 120). The request can specify the other device via any suitable identifier, e.g., an account name, an IP address, a MAC address, etc. The request can be before or after the device determines that the other device is within communication, e.g., as determined by initial signaling, such as a handshake. The data (e.g., in a message or a stream) can be sent any suitable application layer protocol, such as HTTP, RTP, SMTP, MGCP, etc. The other device can be any device, including another device of the user. The request can made be in response to an action by the user, an internal event (e.g., based on time or other criteria) that may be in a same or other application (e.g., a calendar app), or an external event (e.g., in response to a message from another device). An example of an event is a syncing event.

Before sending data, client application 1105 can submit an open socket request (e.g., in a streaming example). The socket request can use information from an identity services (IDS) framework 1115, which can provide an address (or other type of ID) for the other device. For example, client application 1105 can know account information for the second device (e.g., account information of a different or same user), and IDS framework 1115 can store a list of device IDs for a particular account. IDS framework 1115 can be in communication with identity management infrastructure 105 to obtain the list. Thus, IDS framework 1115 can store or otherwise obtain device IDs (e.g., addresses) for all devices that a user has registered with identity management infrastructure 105. For example, IDS framework 1115 can request via an IDS daemon to identity management infrastructure 105 to obtain the device IDs. In one implementation, the socket request can be made to kernel 1110.

In a messaging example, the request to send data can go to IDS framework 1115 to obtain a device ID, which can be sent to message a message controller 1120 and a user tunnel (UTUN) controller 1125. UTUN controller 1125 can establish a mapping between the device ID and an IP address (e.g., a virtual IP address) when the device ID is not an IP address. A socket can be created between message controller 1120 (which assigns a device ID to the socket) and kernel 1110 (which can assigns an address to the socket, such as a virtual IP address). UTUN controller 1120 can be used to create the socket connection between message controller 1120 and kernel 1110. In this manner, the send-date request from client application 1105 does not need to include a device ID, but can specify an account, which can then be cross-referenced by IDS framework 1115 with known devices of the account and their capabilities (e.g., if the request requires certain capabilities). Given that a device ID can be obtained, a pairing does not need to occur prior to creating the socket.

In various embodiments, IDS framework 1115 can receive a particular port/service at the other device from client application 1105, determine the port/service based on information obtained from identity management infrastructure 105, or determine the port/service from a token sent in the request. IDS framework 1115 can then communicate a device ID and other header information to message controller 1120 and/or UTUN controller 1125. IDS framework 1115 and UTUN controller 1125 can communicate via cross process communication (XPC). UTUN controller 1125 can be part of an IDS daemon, and can receive a device ID from identity management infrastructure 105.

As mentioned above, UTUN controller 1125 can create a virtual address that corresponds to the actual device address, where the virtual address can be used to create a virtual socket. A virtual socket can also be created using any device ID (e.g., an actual address of a device or other ID). As an example, a socket can be created for communication between client application 1105 and kernel 1110 (e.g., in a streaming context), where kernel 1110 can have various sockets open with various client applications. Kernel 1110 can have a single connection to UTUN controller 1125 for the other device and multiplex (mux) the data from various client applications into the single connection. Instead or in addition, UTUN controller 1125 can also perform the muxing, e.g., if multiple socket exist between kernel 1110 and UTUN controller 1125 for various client applications to the other device. Incoming data can be demultiplexed (demuxed) for sending to the destination client application.

As another example, a socket can be created between kernel 1110 and message controller 1120 (e.g., in a messaging context), where a socket can be created for each destination device, with different sockets to a same device potentially having different priorities. Thus, a particular virtual socket can be associated with a particular device and a particular priority (e.g., high and low). Message controller 1120 can have various connections to various client applications. Thus, message controller 1120 can provide mux/demux capabilities.

UTUN controller can create a primary socket with the other device. When UTUN controller 1125 receives data using a virtual connection associated with the second device, it can then map the virtual connection to the primary socket for communicating with the other device. All data for the other device can then be sent out through the primary socket. The virtual address for a virtual socket can be passed back to client application 1115, e.g., in the stream context. In one embodiment, a virtual socket involving kernel 1110 is a TCP socket. The virtual address can have a same format as a regular address, e.g., an IPv6 address. A mux module can include any combination of kernel 1110, message controller 1120, and UTUN controller 1125.

When client application 1105 sends data, client application 1105 can use the virtual socket to send data to kernel 1110. For example, the data can be sent using TCP via the virtual socket. Kernel 1110 can implement an UTUN interface for communicating with UTUN controller 1125. Kernel 1110 would pass the data (e.g., with a TCP header) and the virtual socket identifying the virtual address to UTUN controller 1125, which would then use the virtual address to resolve the device address for determining the device socket.

When sending to the data over the device socket, a link manager 1130 can determine which link to use. A link can be a particular combination of a wireless interface protocol (e.g., Bluetooth or Wi-Fi), a transport protocol (e.g., TCP, UDP, etc), and a destination device. In this manner, UTUN controller 1125 does not need to know how the data is being sent, but instead can simply send the data to link manager 1130.

In various embodiments, the determination by link manager 1130 can be made per data packet, per set of data packets, per device socket, and may change from one data packet to another. Link manager 1130 may then select a link for sending the data. In the example shown, a Wi-Fi link 1135 provides software drivers for communicating with one or more Wi-Fi protocols, and BLTE link 1140 provides software drivers for communicating with Blutooth LE. Wi-Fi link 1135 is in communication with Wi-Fi hardware 1170, and BLTE link 1140 is in communication with BTLE hardware 1165. Wi-Fi link 1135 can be used for various Wi-Fi protocols, such as infra-WiFi (infrastructure WiFi). In one embodiment, link manager 1130 can try all links to determine whether any of the links can contact the other device, and then use a connected link with a highest predetermined rank or dynamic rank.

Hardware 1165-1170 can be in communication with links assigned to various devices. For example, links 1135, 1140, and 1145 can be assigned for communication with a second device. And, other links that are assigned for communication with a third device can also be in communication with hardware 1165-1170. When a particular hardware receives data, software can identify a particular sending device and then determine the corresponding link, e.g., using header information to determine the link corresponding to the sending device and transport protocol.

In some embodiments, a combined link 1145 can include an interface 1155 for communicating with link manager 1130 and a selector 1150 that selects a particular protocol to use. The protocols can be the same or different than that available to link manager 1130. Selector 1150 can perform similar functions as link manager 1130 in that a particular link is selected. However, link manager 1130 and selector 1150 can use different criteria for determining which link to use. For example, link manager 1130 can determine to use combined link 1145, and selector 1150 can then determine that BTLE hardware 1165 is to be used. The hardware can be contained on a same or separate chips.

One or more protocols can be only available via combined link 1145, such as classic Bluetooth hardware 1150. Link manager 1130 and selector 1150 can use various criteria for determining which link to use, such as power usage of a link, speed of a link (e.g., real-time data rate), and signal strength of a link. A goal of the optimization for selecting a link can be to provide a minimal data rate at a lowest possible energy.

IV. Mobile Device

Figure 12:
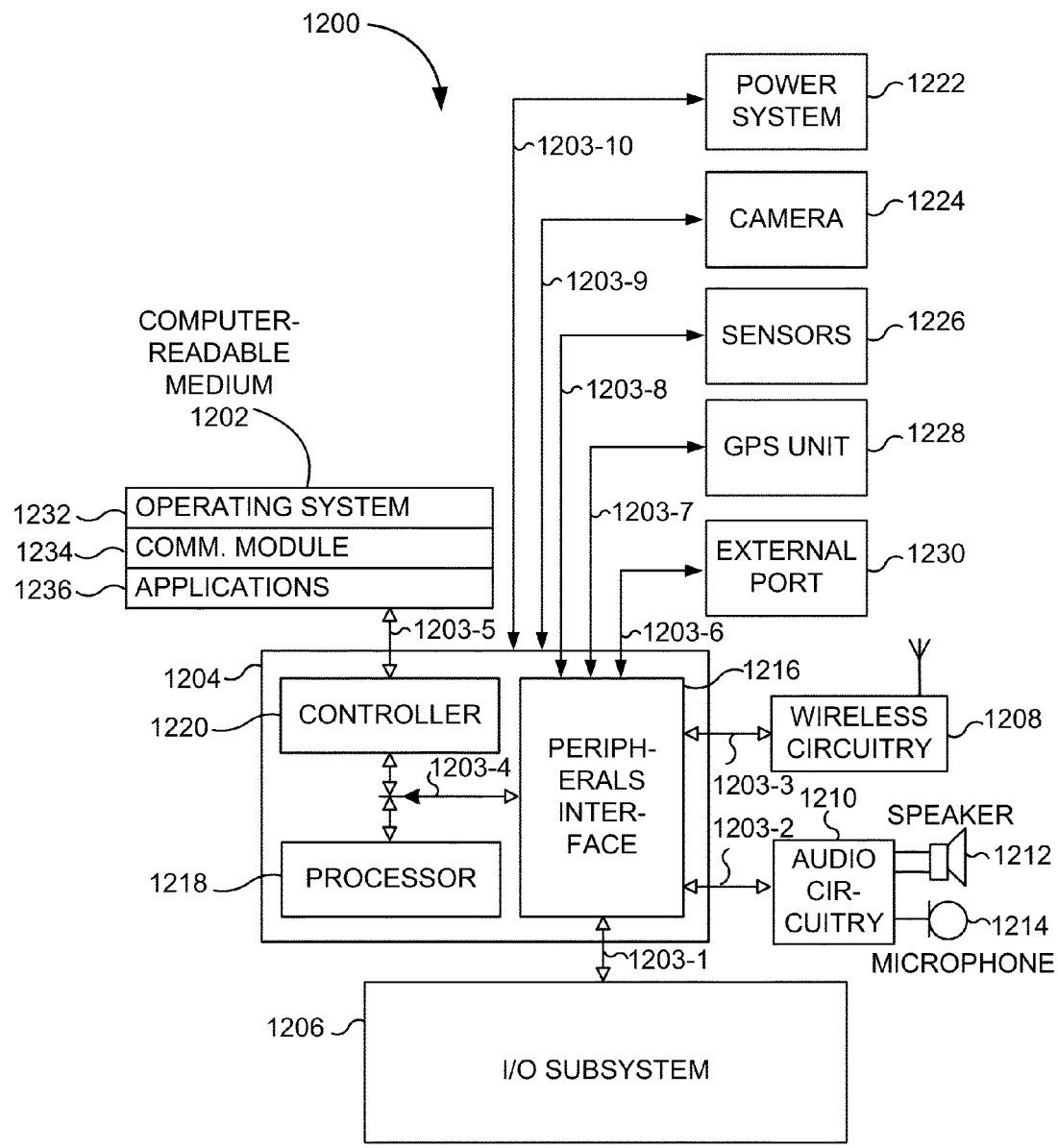
FIG. 12 is a block diagram of a portable electronic device or mobile device according to an embodiment.

FIG. 12 is a block diagram of a portable electronic device or mobile device 1200 according to an embodiment. Mobile device 1200 generally includes computer-readable medium 1202, a processing system 1204, an Input/Output (I/O) subsystem 1206, wireless circuitry 1208, and audio circuitry 1210 including speaker 1212 and microphone 1214. These components may be coupled by one or more communication buses or signal lines 1203. Mobile device 1200 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 12 is only one example of an architecture for mobile device 1200, and that mobile device 1200 can have more or fewer components than shown, or a different configuration of components. The various components shown in FIG. 12 can be implemented in hardware, software, or a combination of both hardware and software, including one or more signal processing and/or application specific integrated circuits.

Wireless circuitry 1208 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1208 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 1208 is coupled to processing system 1204 via peripherals interface 1216. Interface 1216 can include conventional components for establishing and maintaining communication between peripherals and processing system 1204. Voice and data information received by wireless circuitry 1208 (e.g., in speech recognition or voice command applications) is sent to one or more processors 1218 via peripherals interface 1216. One or more processors 1218 are configurable to process various data formats.

Peripherals interface 1216 couple the input and output peripherals of device 1200 to the one or more processors 1218 and computer-readable medium 1202. One or more processors 1218 communicate with computer-readable medium 1202 via a controller 1220. Computer-readable medium 1202 can be any device or medium that can store code and/or data for use by one or more processors 1218. Medium 1202 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1216, one or more processors 1218, and memory controller 1220 can be implemented on a single chip, such as processing system 1204. In some other embodiments, they can be implemented on separate chips.

Mobile device 1200 also includes a power system 1222 for powering the various hardware components. Power system 1222 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1200 includes a camera 1224. In some embodiments, mobile device 1200 includes sensors 1226. Sensors can include accelerometers, compass, gyrometer, pressure sensors, audio sensors, light sensors, barometers, and the like. Sensors 1226 can be used to sense location aspects, such as auditory or light signatures of a location. In some embodiments, mobile device 1200 can include a GPS receiver, sometimes referred to as a GPS unit 1228. A mobile device can use a satellite navigation system, such as the Global Positioning System (GPS), to obtain position information, timing information, altitude, or other navigation information. In some embodiments, mobile device 1200 can include external port 1230 (e.g., USB, FireWire, Lightning connector, 120-pin connector, etc.). External port 1230 can be adapted for coupling directly to other devices or indirectly over a network (e.g., the Internet, wireless LAN, etc.).

One or more processors 1218 run various software components stored in medium 1202 to perform various functions for device 1200. In some embodiments, the software components include operating system 1232, communication module (or set of instructions) 1234, and other applications (or set of instructions) 1236. Operating system 1232 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1234 facilitates communication with other devices over one or more external ports 1230 or via wireless circuitry 1208 and includes various software components for handling data received from wireless circuitry 1208 and/or external port 1230.

The one or more applications 1236 on mobile device 1200 can include any applications installed on the device 1200, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1206 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1206 can include a display and user input devices such as a keyboard, mouse, and/or trackpad. In some embodiments, I/O subsystem 1206 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1202) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1206 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1200 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of a mobile device (e.g., a wrist-worn device) and/or a companion device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for proxied communications, the method comprising:
at a proxied device having one or more processors, a memory, and a communications interface:
establishing, via the communications interface, a first link between the proxied device and a proxy device, wherein the proxy device has a second link with a content infrastructure server;
sending a message to the proxy device, the message providing presence information for the proxied device, wherein the presence information is sent to the content infrastructure server for instructing the content infrastructure server to associate the proxied device with an existing mapping between the proxy device and the second link;
receiving a device identifier for the proxied device from the content infrastructure server via the proxy device;
initiating an application on the proxied device, wherein the application is associated with a content provider;
sending the device identifier to the content provider;
terminating the first link;
re-establishing via the communications interface the first link;
receiving a push notification for the application from the proxy device, and wherein the push notification is routed by the content infrastructure server from the content provider to the proxy device using the device identifier and the association between the proxied device and the existing mapping between the proxy device and the second link; and
storing the push notification in the memory,
wherein the proxy device comprises a mobile device, and wherein the proxied device comprises a wearable device.

2. The method of claim 1 wherein the push notification includes an application token.

3. The method of claim 1 wherein establishing via the communications interface the first link between the proxied device and the proxy device comprises establishing a wireless connection with the proxy device.

4. The method of claim 1 wherein terminating the first link comprises sending a message to the proxy device indicating an offline status for the proxied device.

5. The method of claim 1 wherein terminating the first link comprises reducing communications with the proxied device for a predetermined period of time.

6. The method of claim 1 wherein the push notification represents an email notification, an instant message notification, a short message service (SMS) notification, a multimedia message service (MMS) notification, or a content status notification.

7. The method of claim 1 further comprising:
sending information to the proxy device indicating delivery of the push notification at the proxied device.

8. The method of claim 1 further comprising:
establishing a persistent connection between the proxied device and the content infrastructure server that instructs the content infrastructure server to disassociate the proxied device with the existing mapping between the proxy device and the second link that the proxy device maintains with the content infrastructure server; and
receiving one or more push notifications using the persistent connection between the proxied device and the content infrastructure server.

9. The method of claim 1 further comprising:
generating a display of the push notification that includes a visual representation of a type associated with the push notification.

10. The method of claim 1 further comprising:
terminating the first link with the proxy device; and
establishing, via the communications interface, a third link with a second proxy device in order to receive push notifications associated with the proxied device from the second proxy device.

11. The method of claim 1 wherein the proxied device or proxy device comprises a mobile media player, a smart phone, a wearable device, a tablet, a gaming device, a laptop, or a desktop computer.

12. A computer program product embodied within a non-transitory computer-readable medium storing code executable by one or more processors of a proxied device having a communications interface for proxied communications, the non-transitory computer-readable medium comprising:
code for establishing, via the communications interface, a first link between the proxied device and a proxy device, wherein the proxy device has second link with a content infrastructure server;
code for sending, using the non-persistent link, a message to the proxy device, the message providing presence information for the proxied device, wherein the presence information is sent to the content infrastructure server for instructing the content infrastructure server to associate the proxied device with an existing mapping between the proxy device and the second link;
code for receiving a device identifier for the proxied device from the content infrastructure service via the proxy device;
code for initiating an application on the proxied device, wherein the application is associated with a content provider;
code for sending the device identifier to the content provider;
code for terminating the first link;
code for re-establishing, via the communications interface, the first link;
code for receiving a push notification for the application from the proxy device, wherein the push notification is routed by the content infrastructure server from the content provider to the proxy device using the device identifier and the association between the proxied device and the existing mapping between the proxy device and the second link; and
code for performing one or more actions based on the push notification,
wherein the proxy device comprises a mobile device, and wherein the proxied device comprises a wearable device.

13. The non-transitory computer-readable medium of claim 12 wherein the code for receiving the push notification comprises code for receiving an application token.

14. The non-transitory computer-readable medium of claim 12 wherein the code for establishing or re-establishing via the communications interface the first link between the proxied device and the proxy device comprises code for establishing a wireless connection with the proxy device.

15. The non-transitory computer-readable medium of claim 12 wherein the push notification represents an email notification, an instant message notification, a short message service (SMS) notification, a multimedia message service (MMS) notification, or a content status notification.

16. The non-transitory computer-readable medium of claim 12 further comprising:
code for establishing a persistent connection between the proxied device and the content infrastructure server that instructs the content infrastructure server to disassociate the proxied device with the existing mapping between the proxy device and the second link that the proxy device maintains with the content infrastructure server; and
code for receiving one or more push notifications using the persistent connection between the proxied device and the content infrastructure server.

17. A mobile device comprising:
a hardware processor;
a communications interface; and
a memory storing a set of instructions which when executed by the processor cause the processor to:
establish, via the communications interface, a first link between the mobile device and a companion device, wherein the companion device has a second link with a content infrastructure server;
send, using the first link, a message to the companion device, the message providing presence information for the mobile device, wherein the presence information is sent to the content infrastructure server for instructing the content infrastructure server to associate the mobile device with an existing mapping between the companion device and the second link;
receive a device identifier for the mobile device from the content infrastructure server via the companion device;
initiate an application on the mobile device, wherein the application is associated with a content provider;
send the device identifier to the content provider;
terminate the first link based on one or more power metrics; and
periodically re-establish, via the communications interface, the first link in order to receive push notifications for the application from the companion device, wherein the push notifications include the device identifier, and wherein the push notifications are routed by the content infrastructure server from the content provider to the companion device using the device identifier and the association between the mobile device and the existing mapping between the companion device and the second link,
wherein the companion device comprises a wearable device.

18. The mobile device of claim 17 wherein the set of instructions further cause the processor to:
establish, via the communications interface, a third link with a second companion device; and
receive one or more push notifications associated with the mobile device from the second companion device.

19. The mobile device of claim 17 wherein the set of instructions further cause the processor to:
establish a persistent connection with a second communications interface between the mobile device and the content infrastructure server that instructs the content infrastructure server to disassociate the mobile device with any mappings between any companion devices and any second link that the companion devices maintain with the content delivery service; and
receive one or more push notifications using the persistent connection between the mobile device and the content infrastructure server.

20. The mobile device of claim 17 wherein the set of instructions further cause the processor to perform one or more actions based on receiving a push notification associated with the mobile device from the companion device.

21. The mobile device of claim 20 wherein the set of instructions cause the processor to perform the one or more actions to update a user interface with a visual representation of a type associated with the push notification.

22. The mobile device of claim 20 wherein the set of instructions cause the processor to perform the one or more actions to provide haptic feedback to a user of the mobile device.

23. The mobile device of claim 17 wherein the set of instructions cause the processor to perform the one or more actions to retrieve content from the content infrastructure server.

24. The method of claim 1, wherein the device identifier includes at least one of a token, an account name, an Internet Protocol (IP) address, or a media access control (MAC) address.

* * * * *